US010423736B2

(12) United States Patent
Grace et al.

(10) Patent No.: US 10,423,736 B2
(45) Date of Patent: Sep. 24, 2019

(54) METHODS AND SYSTEMS FOR SIMULATING HYDRODYNAMICS IN GAS-SOLID FLUIDIZED BEDS

(71) Applicants: The University of British Columbia, Vancouver (CA); The Regents of the University of Colorado, a body corporate, Denver, CO (US)

(72) Inventors: John Grace, Vancouver (CA); Amir Hossein Ahmadi-Motlagh, North Vancouver (CA); Martha Salcudean, Vancouver (CA); Christine Hrenya, Boulder, CO (US)

(73) Assignee: University of British Columbia, Vancouver, British Columbia (CA)

( * ) Notice: Subject to any disclaimer, the term of this patent is extended or adjusted under 35 U.S.C. 154(b) by 360 days.

(21) Appl. No.: 15/247,720

(22) Filed: Aug. 25, 2016

(65) Prior Publication Data

US 2017/0061048 A1    Mar. 2, 2017

Related U.S. Application Data

(60) Provisional application No. 62/211,582, filed on Aug. 28, 2015.

(51) Int. Cl.
*G06F 17/50* (2006.01)
(52) U.S. Cl.
CPC .............................. *G06F 17/5009* (2013.01)
(58) Field of Classification Search
CPC .................................................. G06F 17/5009
(Continued)

(56) References Cited

U.S. PATENT DOCUMENTS

| 4,588,790 A | * | 5/1986 | Jenkins, III | ............ B01J 8/1809 526/70 |
| 4,855,521 A | * | 8/1989 | Avidan | ...................... C07C 2/00 585/415 |

(Continued)

OTHER PUBLICATIONS

Chen et al. ("Fluidization of Coated Group C Powders", American Institute of Chemical Engineers,2008, pp. 104-121) (Year: 2008).*

(Continued)

*Primary Examiner* — Brian S Cook
*Assistant Examiner* — Iftekhar A Khan
(74) *Attorney, Agent, or Firm* — Chernoff, Vilhauer, McClung & Stenzel, LLP

(57) ABSTRACT

A computer implemented method simulates the behavior of a gas-solid mixture in a fluidized bed having a particulate comprising Geldart group A particles using a Eulerian model comprising, for each time step (a current time step) and for each cell: obtaining an initial value of an agglomerate diameter corresponding to the cell and corresponding to the beginning of the current time step; performing a force-balance procedure for the cell to determine a first agglomerate diameter corresponding to the cell and corresponding to the current time step, wherein performing the force-balance procedure comprises determining a plurality of forces for the cell based at least in part on the initial value of the agglomerate diameter; updating one or more drag relationships for the current time step based at least in part on the first agglomerate diameter; and performing a computational fluid dynamic (CFD) solve procedure to determine, for the current time, the any one or more of: one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. Performing the (Continued)

CFD solve procedure is based at least in part on the updated drag relationships.

23 Claims, 10 Drawing Sheets

(58) Field of Classification Search
USPC .................................................. 703/9
See application file for complete search history.

(56) References Cited

U.S. PATENT DOCUMENTS

| | | | | |
|---|---|---|---|---|
| 6,212,794 | B1* | 4/2001 | Zhu | B01J 8/1818 34/576 |
| 6,301,546 | B1* | 10/2001 | Weinstein | B01J 8/1809 702/23 |
| 6,460,412 | B1* | 10/2002 | Cai | B01J 8/1809 73/290 V |
| 7,947,797 | B2* | 5/2011 | Muhle | B01J 8/1809 526/170 |
| 9,677,393 | B2* | 6/2017 | Morris | E21B 43/267 |
| 2003/0168331 | A1* | 9/2003 | Smith | B01J 8/42 204/164 |
| 2005/0036940 | A1* | 2/2005 | Grace | B01J 8/0055 423/652 |
| 2005/0106310 | A1* | 5/2005 | Green | B01J 2/10 426/650 |
| 2006/0101943 | A1* | 5/2006 | Snow | C01B 3/001 75/252 |
| 2008/0118407 | A1* | 5/2008 | Grace | B01J 8/006 422/141 |
| 2008/0216655 | A1* | 9/2008 | Vimalchand | B01D 45/12 95/271 |
| 2009/0286675 | A1* | 11/2009 | Wei | B01J 8/0055 502/184 |
| 2011/0146678 | A1* | 6/2011 | Ruecroft | A61K 9/0075 128/203.15 |
| 2012/0149824 | A1* | 6/2012 | Hocke | B01J 21/185 524/496 |
| 2014/0212587 | A1* | 7/2014 | Malshe | C10M 171/06 427/331 |
| 2014/0302147 | A1* | 10/2014 | Hartman | A61K 9/1617 424/489 |
| 2015/0273421 | A1* | 10/2015 | De Wilde | B01J 8/14 427/213 |
| 2016/0045435 | A1* | 2/2016 | Green | A61K 9/0075 424/489 |
| 2016/0146456 | A1* | 5/2016 | Guillou | F23C 10/005 431/7 |

OTHER PUBLICATIONS

Benzari et al. ("Drag models for Simulation Gas-Solid Flow in the Bubbling Fluidized Bed of FCC Particles", World Academy of Science, Engineering and Technology 61 2012, pp. 1138-1143) (Year: 2012).*
Ye et al. ("The effects of particle and gas properties on the fluidization of Geldart A particles", Chemical Engineering Science 60 (2005) 4567-4580) (Year: 2005).*
Junwu Wang ("A Review of Eulerian Simulation of Geldart A Particles in Gas-Fluidized Beds", Ind. Eng. Chem. Res. 2009, 48, 5567-5577) (Year: 2009).*
Karimipour et al. ("Application of the particle in cell approach for the simulation of bubbling fluidized beds of Geldart A particles", Powder Technology 220 (2012) 63-69) (Year: 2012).*
Benzarti et al. ("Drag models for Simulation Gas-Solid Flow in the Bubbling Fluidized Bed of FCC Particles", World Academy of Science, Engineering and Technology 61 2012, pp. 1138-1143) (Year: 2012).*
Chalermsinsuwan et al. (Two- and three-dimensional CFD modeling of Geldart A particles in a thin bubbling fluidized bed: Comparison of turbulence and dispersion coefficients, Chemical Engineering Journal 171 (2011) 301-313) (Year: 2011).*
Van Wachem et al. (CFD Modeling of Gas-Fluidized Beds with a Bimodal Particle Mixture, AIChE Journal, 2001, pp. 1292-1302) (Year: 2001).*
Lettieri et al. (Challenges and Issues on the CFD Modeling of Fluidized Beds: a Review, Journal of Computational Multiphase Flows , 2009, pp. 83-131) (Year: 2009).*
Leu et al. (Hydrodynamics of Geldart group A particles in gas-solid fluidized beds, 2001, ECCTD) (Year: 2001).*
Igci, Y. (2011). Closures for Coarse-Grid Simulation of Fluidized Gas-Particle Flows. PhD Thesis. Princeton University, Dept. of Chemical & Biological Engineering, Princeton, NJ. Part1.
Igci, Y. (2011). Closures for Coarse-Grid Simulation of Fluidized Gas-Particle Flows. PhD Thesis. Princeton University, Dept. of Chemical & Biological Engineering, Princeton, NJ. Part2.
Igci, Y. (2011). Closures for Coarse-Grid Simulation of Fluidized Gas-Particle Flows. PhD Thesis. Princeton University, Dept. of Chemical & Biological Engineering, Princeton, NJ. Part3.
Igci, Y. (2011). Closures for Coarse-Grid Simulation of Fluidized Gas-Particle Flows. PhD Thesis. Princeton University, Dept. of Chemical & Biological Engineering, Princeton, NJ. Part4.
Igci, Y. (2011). Closures for Coarse-Grid Simulation of Fluidized Gas-Particle Flows. PhD Thesis. Princeton University, Dept. of Chemical & Biological Engineering, Princeton, NJ. Part5.
Igci, Y., Iv, A. T. A., Sundaresan, S., & Brien, T. O. (2008). Filtered Two-Fluid Models for Fluidized Gas-Particle Suspensions. AIChE Journal, 54(6), 1431-1448.
Igci, Y., & Sundaresan, S. (2011). Verification of Filtered Two-Fluid Models for Gas-Particle Flows in Risers. AIChE Journal, 57(10), 2691-2707.
Israelachili, J. (1992). Intermolecular & Surface Forces (Second Edi.). Santa Barbara: Academic Press. Part1.
Israelachili, J. (1992). Intermolecular & Surface Forces (Second Edi.). Santa Barbara: Academic Press. Part2.
Israelachili, J. (1992). Intermolecular & Surface Forces (Second Edi.). Santa Barbara: Academic Press. Part3.
Israelachili, J. (1992). Intermolecular & Surface Forces (Second Edi.). Santa Barbara: Academic Press. Part4.
Israelachili, J. (1992). Intermolecular & Surface Forces (Second Edi.). Santa Barbara: Academic Press. Part5.
Israelachili, J. (1992). Intermolecular & Surface Forces (Second Edi.). Santa Barbara: Academic Press. Part6.
Israelachili, J. (1992). Intermolecular & Surface Forces (Second Edi.). Santa Barbara: Academic Press. Part7.
Israelachili, J. (1992). Intermolecular & Surface Forces (Second Edi.). Santa Barbara: Academic Press. Part8.
Israelachili, J. (1992). Intermolecular & Surface Forces (Second Edi.). Santa Barbara: Academic Press. Part9.
Iyer, V. A. Abraham, J. & Magi, V. (2002). Exploring Injected Droplet Size Effects on Steady Liquid Penetration in a Diesel Spray with a Two-Fluid Model, 45, 519-531.
Jaeger, H. M., & Nagel, S. R. (1992). Physics of Granular States. Science, 255(1523-1531).
Jalalinejad, F. (2013). Electro-Hydrodynamics of Gas-Solid Fluidized Beds. The University of British Columbia. Part1.
Jalalinejad, F. (2013). Electro-Hydrodynamics of Gas-Solid Fluidized Beds. The University of British Columbia. Part2.
Jalalinejad, F. (2013). Electro-Hydrodynamics of Gas-Solid Fluidized Beds. The University of British Columbia. Part3.
Johnson, P.C., Jackson, R. (1987). Frictional Collisional Constitutive Relations for Antigranulocytes—Materials, with Application to Plane Shearing. Journal of Fluid Mechanics, 176, 67-93.
Kelly-Zion, P. L., Pursell, C. J., Vaidya, S., & Batra, J. (2011). Evaporation of Sessile Drops under Combined Diffusion and Natural Convection. Colloids and Surfaces A: Physicochemical and Engineering Aspects, 381(1-3), 31-36.
Khan, A. R., & Richardson, J. F. (1990). Pressure Gradient and Friction Factor for Sedimentation and Fluidisation of Uniform Spheres in Liquids. Chemical Engineering Science, 45(1), 255-265.
Kim, H., & Arastoopour, H. (2002). Extension of Kinetic Theory to Cohesive Particle Flow. Powder Technology, 83-94.

(56) References Cited

OTHER PUBLICATIONS

Lacks, D. J. (2012). The Unpredictability of Electrostatic Charging. Angewandte Chemie International Edition, (51), 6822-6823.

Leach, A. Portoghese, F., Briens, C., & Berruti, F. (2008). A New and Rapid Method for the Evaluation of the Liquid-Solid Contact Resulting from Liquid Injection into a Fluidized Bed. Powder Technology, 184(1), 44-51.

Leach, A., Chaplin, G., Briens, C., & Berruti, F. (2009). Comparison of the Performance of Liquid-Gas Injection Nozzles in a Gas-Solid Fluidized Bed. Chemical Engineering and Processing, 48,780-788.

Leclere, K., Briens, C., Gauthier, T., Bayle, J., Guigon, P., & Bergougnou, M. (2004). Experimental Measurement of Droplet Vaporization Kinetics in a Fluidized Bed. Chemical Engineering and Processing, 43(6), 693-699.

Leclere, K., Briensl, C. L., Bayle, J., Gauthier, T., Bergougnoul, M. A., & Guigon, P. (2001). Experimental Study of Droplet Vaporization in a Fluidized Bed. Canadian Journal of Chemical Engineering, 79.

Leclère K., Briens, C., Gauthier, T., Bayle, J., Bergougnou, M., & Guigon, P. (2001). Liquid Vaporization in a Fluidized Bed. Industrial & Engineering Chemistry Research, 40(23), 5415-5420.

Lewis, W. K., Gillilland, E. R., Reh, L., Squires, A., Yerushalmi, J., & Kwauk, M. (1992). A Note on Terminology: "Clusters" and "Agglomerates." Powder Technology, 70,195-196.

Li, T., Mahecha-Botero, A., & Grace, J. R. (2010). Computational Fluid Dynamic Investigation of Change of Volumetric Flow in Fluidized-Bed Reactors. Ind. Eng. Chem., 6780-6789.

Li, T. Grace, J., Bi, X., Reid, K., & Wormsbecker, M. (2011). Numerical Investigation of Fluid COKINGTM Units, Part II: Modelling of Feed Vaporisation. Canadian Journal of Chemical Engineering, 1-15.

Li, T., Grace, J. R., & Bi, X. (2010b). Numerical Investigation of Gas Mixing in Gas-Solid Fluidized Beds. AIChE Journal, 56(9).

Li, T., Grace, J., & Bi, X. (2010a). Study of Wall Boundary Condition in Numerical Simulations of Bubbling Fluidized Beds. Powder Technology, 203(3), 447-457.

Liu, G. (2003). Evaporating Crossflow Sprays in Gas-Solid Flows. PhD Thesis. New Jersey Institute of Technology. Part1.

Liu, G. (2003). Evaporating Crossflow Sprays in Gas-Solid Flows. PhD Thesis. New Jersey Institute of Technology. Part2.

Liu, G. (2003). Evaporating Crossflow Sprays in Gas-Solid Flows. PhD Thesis. New Jersey Institute of Technology. Part3.

Liu, X., & Xu, X. (2009). Modelling of Dense Gas-Particle Flow in a Circulating Fluidized Bed by Distinct Cluster Method ( DCM ). Powder Technology, 195(3), 235-244.

Loezos, P.N., & Sundaresan, S. (2005). Coarse-Grid Simulation of Gas-Particle Flows in Vertical Risers. Industrial & Engineering Chemistry Research, 44(16), 6022-6037.

Vashisth, S., et al., Comparison of numerical approaches to model FCC particles in gas-solid bubbling fluidized bed. Chemical Engineering Science 134 (2015), pp. 269-286.

Van Wachem et al. (2008). Derivation, Simulation and Validation of a Cohesive Particle Flow CFD Model. American Institute of Chemical Engineers, 2008, vol. 54, No. 1, 9-19.

Karimipour et al. (2012). Application of the particle in cell approach for the simulation of bubbling fluidized beds of Geldart A particles. Powder Technology 220 (2012) 63-69.

Wang (2009). A Review of Eulerian Simulation of Geldart A Particles in Gas-Fluidized Beds. Ind. Eng. Chem. Res. 2009, 48, 5567-5577.

Wang (2012). Hydrodynamic modeling of particle rotation in bubbling gas-fluidized beds. International Journal of Multiphase Flow 39 (2012) 159-178.

Zimmermann et al. (2005). CFD Modeling of the Hydrodynamics and Reaction Kinetics of FCC Fluidized-Bed Reactors. Ind. Eng. Chem. Res. 2005, 44, 9818-9827.

Huilin et al. (2003). Hydrodynamic Simulations of Gas-Solid Flow in a Riser. Ind. Eng. Chem. Res. 2003, 42, 2390-2398.

Agrawal, K., Loezos, P. N., Syamlal, M., & Sundaresan, S. (2001). The Role of Meso-Scale Structures in Rapid Gas-Solid Flows. Journal of Fluid Mechanics, 445, 151-185.

A.H. Ahmadi-Motlagh et al., New structure-based model for Eulerian simulation of hydrodynamics in gas-solid fluidized beds of Geldart group "A" particles. Chemical Engineering Science 120 (2014), pp. 22-36.

Anderson, T. B., & Jackson, R. (1967). A Fluid Mechanical Description of Fluidized Beds. Ind. Eng. Chem. Fund., 6(4), 527-539.

Arastoopour, H. & Gidspow, D. (1979). Analysis of IGT Pneumatic Conveying Data and Fast Fluidization Using a Thermohydrodynamic Model, Powder Technology, 22(1), 77-87.

Ariyapadi, S. (2004). Interaction Between Horizontal Gas-Liquid Jets and Gas-Solid fFuidized Beds. PhD Thesis. Western University, London, ON. Part1.

Ariyapadi, S. (2004). Interaction Between Horizontal Gas-Liquid Jets and Gas-Solid fFuidized Beds. PhD Thesis. Western University, London, ON. Part2.

Ariyapadi, S. (2004). Interaction Between Horizontal Gas-Liquid Jets and Gas-Solid fFuidized Beds. PhD Thesis. Western University, London, ON. Part3.

Ariyapadi, S. (2004). Interaction Between Horizontal Gas-Liquid Jets and Gas-Solid fFuidized Beds. PhD Thesis. Western University, London, ON. Part4.

Ariyapadi, S. (2004). Interaction Between Horizontal Gas-Liquid Jets and Gas-Solid fFuidized Beds. PhD Thesis. Western University, London, ON. Part5.

Benyahia, S. (2012). Analysis of Model Parameters Affecting the Pressure Profile in a Circulating Fluidized Bed AIChE Journal, 58(2), 427-439.

Benyahia, S., Syamlal, M., & Brien, T. J. O. (2007). Study of the Ability of Multiphase Continuum Models to Predict Core-Annulus Flow. AIChE Journal, 53(10).

Beyhaghi, S., Prat, M., & Pillai, K. M. (2014). Wicking and Evaporation of Liquids in Porous Wicks : A Simple Analytical Approach to Optimization of Wick Design. AIChE Journal, 60(5).

Bruhns, S., & Werther, J. (2005). An Investigation of the Mechanism of Liquid Injection into Fluidized Beds. AIChE Journal, 51(3), 766-775.

Bruhns, S. (2002). On the Mechanism of Liquid Injection into Fluidized Bed Reactors. PhD Thesis. Technischen Universität Hamburg-Harburg. Part1.

Bruhns, S. (2002). On the Mechanism of Liquid Injection into Fluidized Bed Reactors. PhD Thesis. Technischen Universität Hamburg-Harburg. Part2.

Bruhns, S. (2002). On the Mechanism of Liquid Injection into Fluidized Bed Reactors. PhD Thesis. Technischen Universität Hamburg-Harburg. Part3.

Cammarata, L., Lettieri, P., Micale, G. D. M., & Colman, D. (2003). 2D and 3D CFD Simulations of Bubbling Fluidized Beds Using Eulerian-Eulerian Models. International Journal of Chemical Reactor Engineering, 1(A48).

Chalermsinsuwan, B., Gidaspow, D., & Piumsomboon, P. (2011). Two- and Three-Dimensional CFD Modeling of Geldart A Particles in a Thin Bubbling Fluidized Bed: Comparison of Turbulence and Dispersion Coefficients. Chemical Engineering Journal, 171(1), 301-313.

Chen, Y., Yang, J., Dave, R., Pfeffer, R. (2008). Fluidization of Coated Group C Powders. AIChE Journal, 54(1), 104-121.

Cocco, R., Shaffer, F., Hays, R., Reddy Kant S.B., Knowlton, T. (2010). Particle Clusters in and Above Fluidized Beds. Powder Technology, 203(1), 3-11.

Czachor, H. (2007). Applicability of the Washburn Theory for Determining the Wetting Angle of Soils. Hydrological Processes, 2247, 2239-2247.

Darabi, P., Pougatch, K., Salcudean, M., & Grecov, D. (2009). A Novel Coalescence Model for Binary Collision of Identical Wet Particles. Chemical Engineering Science.

Darabi, P. (2011). Mathematical Modeling of Interaction of Wet Particles and Application to Fluidized Beds. PhD Thesis, (May). Part1.

(56) References Cited

OTHER PUBLICATIONS

Darabi, P. (2011). Mathematical Modeling of Interaction of Wet Particles and Application to Fluidized Beds. PhD Thesis, (May). Part2.

Darabi, P. (2011). Mathematical Modeling of Interaction of Wet Particles and Application to Fluidized Beds. PhD Thesis, (May). Part3.

Davis, R. H., Rager, D. a., & Good, B. T. (2002). Elastohydrodynamic Rebound of Spheres from Coated Surfaces. Journal of Fluid Mechanics, 468, 107-119.

Deen, N. G., Van Sint Annaland, M., Van der Hoef, M. A., & Kuipers, J. A. M. (2007). Review of Discrete Particle Modeling of Fluidized Beds. Chemical Engineering Science, 62(1-2), 28-44.

Donahue, C. M., Hrenya, C. M., Davis, R. H., Nakagawa, K. J., Zelinskaya, A. P., & Joseph, G. G. (2010). Stokes' Cradle: Normal Three-Body Collisions between Wetted Particles. Journal of Fluid Mechanics, 650, 479.

Du, B., Warsito, W., & Fan, L. (2006). Flow Dynamics of Gas-Solid Fluidized Beds with Evaporative Liquid Injection. China Particuology, 4(1), 1-8.

Dubrawski, K., Tebianian, S., Bi, H.T., Chaouki, J., Ellis, N., Gerspacher, R., Jafari, R., Kantzas, A., Lim, C., Patience, G.S., Pugsley, T., Qi, M.Z., Zhu, J.X., Grace, J. R. (2013). Traveling Column for Comparison of Invasive and Non-Invasive Fluidization Voidage Measurement Techniques. Powder Technology, 235, 203-220.

Ennis, B. J., Tardos, G., & Pfeffer, R. (1991). A Microlevel-Based Characterization of Granulation Phenomena. Powder Technology, 65(1-3), 257-272.

Fan, L., Lau, R., Zhu, C., Vuong, K, Warsito, W., Wang, X., & Liu, G. (2001). Evaporative Liquid Jets in Gas—Liquid—Solid Flow System. Chemical Engineering Science, 56, 5871-5891.

Farkhondehkavaki, M., Engineering, B., & Studies, P. (2012). Developing Novel Methods to Characterize Liquid Dispersion in a Fluidized Bed. PhD Thesis. Part1.

Farkhondehkavaki, M., Engineering, B., & Studies, P. (2012). Developing Novel Methods to Characterize Liquid Dispersion in a Fluidized Bed. PhD Thesis. Part2.

Farkhondehkavaki, M., Engineering, B., & Studies, P. (2012). Developing Novel Methods to Characterize Liquid Dispersion in a Fluidized Bed. PhD Thesis. Part3.

Farkhondehkavaki, M., Engineering, B., & Studies, P. (2012). Developing Novel Methods to Characterize Liquid Dispersion in a Fluidized Bed. PhD Thesis. Part4.

Forsyth, A., & Rhodes, M. (2000). A Simple Model Incorporating the Effects of Deformation and Asperities into the van der Waals Force for Macroscopic Spherical Solid Particles. Journal of Colloid and Interface Science, 223(1), 133-138.

Galet, L., Patry, S., & Dodds, J. (2010). Determination of the Wettability of Powders by the Washburn Capillary Rise Method with Bed Preparation by a Centrifugal Packing Technique. Journal of Colloid and Interface Science, 346(2), 470-5.

Galvin, J.E., Benyahia, S. (2013). The Effect of Cohesive Forces on the Fluidization of Aeratable Powders. AlChE Journal, 1-12.

Gao, J., Xu, C., Lin, S., Yang, G., & Guo, Y. (1999). Advanced Model for Turbulent Gas-Solid Flow and Reaction in FCC Riser Reactors. AlChE Journal, 45(5), 1095-1113.

Gao, J, Chang, J, Xu, C, Lan, X, Yang, Y. (2008). CFD Simulation of Gas Solid Flow in FCC Strippers. Chemical Engineering Science, 63(7), 1827-1841.

Ge, Y., & Fan, L.-S. (2006). Three-Dimensional Direct Numerical Simulation for Film-Boiling Contact of Moving Particle and Liquid Droplet. Physics of Fluids, 18(11).

Gibilaro, L. G., Felice, R. D. I., & Foscolo, P. U. (1985). Friction Factor and Drag Coefficient Correlations for Fluid-Particle Interactions. Chemical Engineering Science, 40(10), 1817-1823.

Gidaspow, D., & Lu, H. (1998). Equation of State and Radial Distribution Functions of FCC Particles in a CFB. AlChE Journal, 44(2), 279-293.

Gupta, A. (2003). Effect of Feed Atomization on FCC Performance: Simulation of Entire Unit. Chemical Engineering Science, 58(20), 4567-4579.

Gupta, A. (2001). Model for the Performance of a Fluid Catalytic Cracking (FCC) Riser Reactor: Effect of Feed Atomization. Chemical Engineering Science, 56(15), 4489-4503.

Hong, K., Shi, Z., Wang, W., & Li, J. (2013). A Structure-Dependent Multi-Fluid Model (SFM) for Heterogeneous Gas-Solid Flow. Chemical Engineering Science, 99, 191-202.

Hou, Q. F., Zhou, Z. Y., & Yu, A. B. (2012). Micromechanical Modeling and Analysis of Different Flow Regimes in Gas Fluidization. Chemical Engineering Science, 84, 449-468.

Hrenya, C. (2011). Kinetic Theory for Granular Materials : Polydispersity. Computational Gas-Solids Flows and Reacting Systems.

\* cited by examiner

METHODS AND SYSTEMS FOR SIMULATING HYDRODYNAMICS IN GAS-SOLID FLUIDIZED BEDS

RELATED APPLICATIONS

This application claims the benefit of the priority of, and the benefit under 35 USC 119(e) of, U.S. patent application No. 62/211,582 filed 28 Aug. 2015, which is hereby incorporated herein by reference.

TECHNICAL FIELD

The invention relates to gas-solid fluidized beds (such as, by way of non-limiting example, those used in fluid catalytic cracking (FCC) technology). Particular embodiments provided computer-implemented methods and systems for simulating hydrodynamics in such fluidized beds.

BACKGROUND

Gas-solid fluidized beds are well known systems used in reactors and other practical applications such as particle drying and coating. Fluidized beds are formed when a mixture of solid particulate and fluid is placed under conditions which permit the solid/fluid mixture to behave with characteristics of a fluid. Typically, creating a fluidized bed comprises introducing pressurized fluid through the particulate medium. In some circumstances, so called fluidization of the solid/fluid mixture occurs where the pressure drop of the fluid across the particulate elements is sufficient to support the weight (minus buoyancy) of the particulate elements. Fluidized beds are used for a wide variety of industrial processes and/or applications, including, without limitation, fluidized bed reactors, fluidized catalytic cracking (FCC) reactors, fluidized bed combustion, heat or mass transfer applications and/or the like.

One fluidized bed application of considerable commercial importance is the FCC application, which is used, without limitation, in petroleum refineries. Typically, in such refineries, FCC processes are used to convert high-boiling, high-molecular weight hydrocarbon fractions of petroleum crude oils to more valuable gasoline, olefinic gases, and other products. In some typical FCC petroleum refining processes, the feedstock (fluid) used in the fluidized bed comprises a portion of crude oil (which may be referred to as heavy gas oil). The FCC petroleum refinery process typically comprises vaporizing and breaking (cracking) the long-chain molecules of the crude oil into shorter molecules by contacting the feedstock, at high temperature and moderate pressure, with powdered particulate catalyst in a fluidized bed.

There is a general desire to provide models which simulate the behavior of fluidized beds, such as, without limitation, those used in FCC processes and other industrial processes. Such models may, for example, provide a better understanding of reaction mechanisms taking place in the fluidized bed.

There have been prior art attempts to model or simulate the behavior of fluidized beds comprising gas/solid mixtures using computer-based simulation. So called "Computational Fluid Dynamics" (CFD) has been successfully used to model some aspects of the hydrodynamics of gas-solid fluidized beds. With its increased computational capabilities, CFD has become an important tool for understanding the complex phenomena between the gas phase and the particles in fluidized bed reactors. Prior art fluidized bed models can be classified generally as Eulerian-Eulerian, Eulerian-Lagrangian and Eulerian-Lagrangian Hybrid, based on the analytical framework used in the model. In general, the Lagrangian approach involves separate equations of motion for each particle in the flow field, whereas in the Eulerian approach, the solid and fluid phases are treated as separate interpenetrating continua, while the interactions between phases are accounted for by supplementary equations. So called Eulerian-Eulerian simulation may enable modeling of relatively large scale fluidized beds.

A challenge that is faced in CFD models for simulation of gas/solid mixtures in fluidized beds involves the different types of particulates and their corresponding properties. In particular, in Geldart, D. (1973), Types of Gas Fluidization, *Powder Technology*, 7(5), 285-292, Geldart proposed classifying particulate powders into so-called "Geldart Groups" A, B, C and D. Prior art CFD models for simulating the behavior of gas/solid mixtures in fluidized beds exhibit shortcomings when the particulates of interest comprises so-called Geldart group A particles. The most widely used catalyst particles in industrial FCC processes are Geldart group A particles. While the exact cause of the shortcomings of CFD models for Geldart group A is not well understood and without wishing to be bound by theory, some proponents have suggested that formation of agglomerates or clusters in and above a fluidized bed of FCC catalyst particles may be a major cause of inaccuracies in modeling and some suggest further that hydrodynamic factors may not be solely responsible for cluster formation, with cohesive forces, such as electrostatic, capillary and van der Waals forces, also playing a significant role.

There is a general desire to provide computer-implemented models which simulate the behavior of fluidized beds, such as, without limitation, those used in FCC processes and other industrial processes, where the particulate comprises Geldart group A particles.

There have been some prior art attempts to model fluidized beds with Geldart group A particles in the Eulerian-Eulerian framework with so-called "Sub-Grid-Scale" (SGS) models which attempt to model mesoscale structures including bubbles, clusters and agglomerates. These prior art attempts to provide SGS models in the Eulerian-Eulerian framework are reviewed in Wang, J. (2009), A Review of Eulerian Simulation of Geldart A Particles in Gas-Fluidized Beds, *Industrial & Engineering Chemistry Research*, 48(12), 5567-5577. These prior art fluidized bed models exhibit the drawbacks that they are generally limited to specific operating conditions and/or are dependent on arbitrary empirically-determined parameters, which limit their application to different fluidized bed systems and their corresponding industrial applicability.

There is a general desire to provide computer-implemented models which simulate the behavior of fluidized beds, such as, without limitation, those used in FCC processes and other industrial processes, where the particulate comprises Geldart group A particles, where the model improves upon, or at least ameliorates, the drawbacks associated with prior art fluidized bed models.

The foregoing examples of the related art and limitations related thereto are intended to be illustrative and not exclusive. Other limitations of the related art will become apparent to those of skill in the art upon a reading of the description and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method, performed by a computer, for simulating behavior of a gas-solid mixture in a fluidized bed having a particulate comprising Geldart group A particles. The method comprises: discretizing the fluidized bed into a plurality of Eulerian cells and simulating, by the computer, the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. Simulating, by the computer, the behavior of the gas-solid mixture over the series of time steps comprises, for each time step (a current time step) and for each cell: obtaining, by the computer, an initial value of an agglomerate diameter corresponding to the cell and corresponding to the beginning of the current time step; performing, by the computer, a force-balance procedure for the cell to determine a first agglomerate diameter corresponding to the cell and corresponding to the current time step, wherein performing the force-balance procedure comprises determining a plurality of forces for the cell based at least in part on the initial value of the agglomerate diameter; updating, by the computer, one or more drag relationships for the current time step based at least in part on the first agglomerate diameter; and performing, by the computer, a computational fluid dynamic (CFD) solve procedure to determine, for the current time, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. Performing, by the computer, the CFD solve procedure is based at least in part on the updated drag relationships.

For each time step (the current time step) and for each cell: updating, by the computer, the one or more drag relationships for the current time step may comprise updating, by the computer, one or more drag terms in at least one of a conservation of momentum relationship for the gas and a conservation of momentum relationship for the solid for the current time step based at least in part on the first agglomerate diameter; and performing, by the computer, the CFD solve procedure may be based at least in part on the at least one of the conservation of momentum relationships for the gas and the solid having the one or more updated drag terms.

For each time step (the current time step) and for each cell, updating, by the computer, the one or more drag relationships for the current time step based at least in part on the first agglomerate diameter may comprise: determining, by the computer, a number N of primary particles that fit into an assumed agglomerate shape for the current time step based on the first agglomerate diameter; and updating, by the computer, the one or more drag relationships for the current time step based at least in part on the number N of primary particles that fit into the assumed agglomerate shape for the current time step.

For each time step (the current time step) and for each cell, performing, by the computer, the force-balance procedure to determine the first agglomerate diameter may be based at least in part on the magnitudes and directions of at least some of the determined plurality of forces.

For each time step (the current time step) and for each cell, performing, by the computer, the force-balance procedure to determine the first agglomerate diameter may comprise: assigning the cell to be in a particular one of a finite plurality of classification cases based on the directions of the at least some of the determined plurality of forces; and determining the first agglomerate diameter based at least in part on the particular one of the finite plurality of classification cases to which the cell is assigned.

For each time step (the current time step) and for each cell, the determined plurality of forces may comprise: a van der Waals force, a collision force, a gravitational force and a drag force.

For each time step (the current time step) and for each cell, assigning the cell to be in the particular one of the finite plurality of classification cases based on the directions of the at least some of the determined plurality of forces may comprise: determining a notional axis based on opposing directions of the van der Waals force and the collision force; determining a reference axis or plane that is orthogonal to the notional axis; and assigning the cell to be in the particular one of the finite plurality of classification cases based at least in part on the directions of the at least some of the determined plurality of forces relative to the reference axis or plane.

For each time step (the current time step) and for each cell, assigning the cell to be in the particular one of the finite plurality of classification cases based at least in part on the directions of the at least some of the determined plurality of forces relative to the reference axis or plane may comprise: assigning the cell to be in a first case (case A) where the gravitational force and the drag force are oriented to extend away from the reference axis or plane on the same side of the reference axis or plane as the van der Waals force; assigning the cell to be in a second case (case B) where the gravitational force is oriented to extend away from the reference axis or plane on the same side of the reference axis or plane as the van der Waals force and the drag force is oriented to extend away from the reference axis or plane on an opposing side of the reference axis or plane from the van der Waals force; assigning the cell to be in a third case (case C) where the drag force is oriented to extend away from the reference axis or plane on the same side of the reference axis or plane as the van der Waals force and the gravitational force is oriented to extend away from the reference axis or plane on the opposing side of the reference axis or plane from the van der Waals force; and assigning the cell to be in a fourth case (case D) where the gravitational force and the drag force are oriented to extend away from the reference axis or plane on the opposing side of the reference axis or plane from the van der Waals force.

For each time step (the current time step) and for each cell, determining the first agglomerate diameter based at least in part on the particular one of the finite plurality of classification cases to which the cell is assigned may comprise: if an absolute value a sum of the at least some of the determined plurality of forces oriented to extend away from the reference axis or plane on the same side of the reference axis or plane as the van der Waals force is greater than an absolute value of a sum of the at least some of the determined plurality of forces oriented to extend away from the reference axis or plane on the opposing side of the reference axis or plane from the van der Waals force, then determining a new first agglomerate diameter for the current time step; and otherwise, determining the first agglomerate diameter for the current time step to be the same as the initial value of the agglomerate diameter corresponding to the beginning of the current time step.

For each time step (the current time step) and for each cell, determining the first agglomerate diameter based at least in part on the particular one of the finite plurality of classification cases to which the cell is assigned may comprise solving an equation, wherein the equation depends on the particular one of the finite plurality of classification cases to which the cell is assigned.

For each time step (the current time step) and for each cell, determining the first agglomerate diameter based at least in part on the particular one of the finite plurality of classification cases to which the cell is assigned may comprise solving a quadratic equation, wherein the coefficients of the quadratic equation depend on the particular one of the finite plurality of classification cases to which the cell is assigned.

The method may comprise, for each time step (the current time step) and for each cell, prior to updating, by the computer, one or more drag relationships for the current time step based at least in part on the first agglomerate diameter: determining an integer number N of primary particles that fit into an assumed agglomerate shape for the current time step and the cell, the integer number N of primary particles dependent on the first agglomerate diameter; and refining the first agglomerate diameter based at least in part on the integer number N of primary particles.

For each time step (the current time step) and for each cell: determining the integer number N of primary particles based on the first agglomerate diameter may comprise application of either equations (24)-(26) or equations (27)-(29) where $d_{agg\_old}$ is the initial value of the agglomerate diameter and $d_{agg\_new}$ is the first agglomerate diameter; and refining the first agglomerate diameter based at least in part on the integer number N of primary particles may comprise application of either equation (30) or (31).

The method may comprise, for each time step (the current time step) and for each cell, prior to updating, by the computer, one or more drag relationships for the current time step based at least in part on the first agglomerate diameter: verifying, by the computer, that the first agglomerate diameter is allowable by checking that an agglomerate volume determined on the basis of the first agglomerate diameter is less than or equal to a volume of solid in the cell; and if the agglomerate volume is greater than or equal to a volume of solid in the cell, setting an allowable the agglomerate volume to be equal to the volume of the solid in the cell and adjusting the integer number N of primary particles and the first agglomerate diameter based on the allowable agglomerate volume.

For each time step (the current time step) and for each cell, obtaining, by the computer, the initial value of the agglomerate diameter corresponding to the cell and corresponding to the beginning of the current time step may comprise determining the initial value of the agglomerate diameter based at least in part on a solid mass flux associated with one or more neighboring cells in a preceding time step, the one or more neighboring cells sharing a boundary with the cell.

For each time step (the current time step) and for each cell, obtaining, by the computer, the initial value of the agglomerate diameter corresponding to the cell and corresponding to the beginning of the current time step may comprise determining the initial value of the agglomerate diameter based at least in part on the first agglomerate diameters corresponding to the neighboring cells and corresponding to the preceding time step.

For each time step (the current time step) and for each cell, determining the initial value of the agglomerate diameter based at least in part on a solid mass flux associated with one or more neighboring cells in the preceding time step may comprise determining the initial value of the agglomerate diameter based on a subset of the neighboring cells which have solid mass flux in the preceding time step that is oriented into the cell and excluding the neighboring cells which have solid mass flux in the preceding time step that is oriented from the cell into the neighboring cells.

For each time step (the current time step) and for each cell, obtaining, by the computer, the initial value of the agglomerate diameter corresponding to the cell and corresponding to the beginning of the current time step may comprise determining the initial value of the agglomerate diameter based at least in part on the first agglomerate diameters corresponding to the subset of the neighboring cells and corresponding to the preceding time step.

For each time step (the current time step) and for each cell, determining the plurality of forces for the cell may comprise determining an estimate of a van der Waals force for the cell and wherein determining the estimate of the van der Waals force for the cell may be based at least in part on a model for asperities present on surfaces of particles in the cell.

The model for asperities present on the surfaces of particles in the cell may be based on a size parameter for the asperities and a surface-area-coverage (SAC) parameter for the asperities on the surface of the particles in the cell.

The model for asperities present on the surfaces of particles in the cell may comprise a sum of a plurality of force terms, wherein the plurality of force terms comprise a force term representing particle-particle van der Waals forces, a force term representing particle-asperity van der Waals forces and a force term representing asperity-asperity van der Waals forces.

The model for asperities present on the surfaces of particles in the cell may comprise an assumption that the asperities have hemispherical shapes parameterized by an asperity diameter $d_{as}$.

Another aspect of the invention provides a system for simulating behavior of a gas-solid mixture in a fluidized bed having a particulate comprising Geldart group A particles. The system comprises one or more processors configured to: discretize the fluidized bed into a plurality of Eulerian cells and simulate the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. The one or more processors are configured to simulate the behavior of the gas-solid mixture over the series of time steps by, for each time step (a current time step) and for each cell: obtaining, by the computer, an initial value of an agglomerate diameter corresponding to the cell and corresponding to the beginning of the current time step; performing, by the computer, a force-balance procedure for the cell to determine a first agglomerate diameter corresponding to the cell and corresponding to the current time step, wherein performing the force-balance procedure comprises determining a plurality of forces for the cell based at least in part on the initial value of the agglomerate diameter; updating, by the computer, one or more drag relationships for the current time step based at least in part on the first agglomerate diameter; and performing, by the computer, a computational fluid dynamic (CFD) solve procedure to determine, for the current time, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. Performing, by the computer, the CFD solve procedure is based at least in part on the updated drag relationships.

The processor of the system may be configured to simulate the behavior of the gas-solid mixture using any of the methods described herein.

Another aspect of the invention provides a non-transitory computer-readable medium comprising computer executable code which, when executed by a computer system comprising one computer or a plurality of computers operatively connected using a data communications network, causes the computer system to perform any of the methods described herein.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide a method, performed by a computer, for simulating behavior of a gas-solid mixture in a fluidized bed having a particulate comprising Geldart group A particles. The method comprises discretizing the fluidized bed into a plurality of Eulerian cells and simulating, by the computer, the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell. Simulating, by the computer, the behavior of the gas-solid mixture over the series of time steps comprises, for each time step (a current time step) and for each cell: obtaining, by the computer, an initial value of an agglomerate diameter corresponding to the cell and corresponding to the beginning of the current time step; performing, by the computer, a force-balance procedure for the cell to determine a first agglomerate diameter corresponding to the cell and corresponding to the current time step, wherein performing the force-balance procedure comprises determining a plurality of forces for the cell based at least in part on the initial value of the agglomerate diameter; updating, by the computer, one or more drag relationships for the current time step based at least in part on the first agglomerate diameter; performing, by the computer, a computational fluid dynamic (CFD) solve procedure to determine, for the current time, the any one or more of: one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell; wherein performing, by the computer, the CFD solve procedure is based at least in part on the updated drag relationships.

Figure 1:
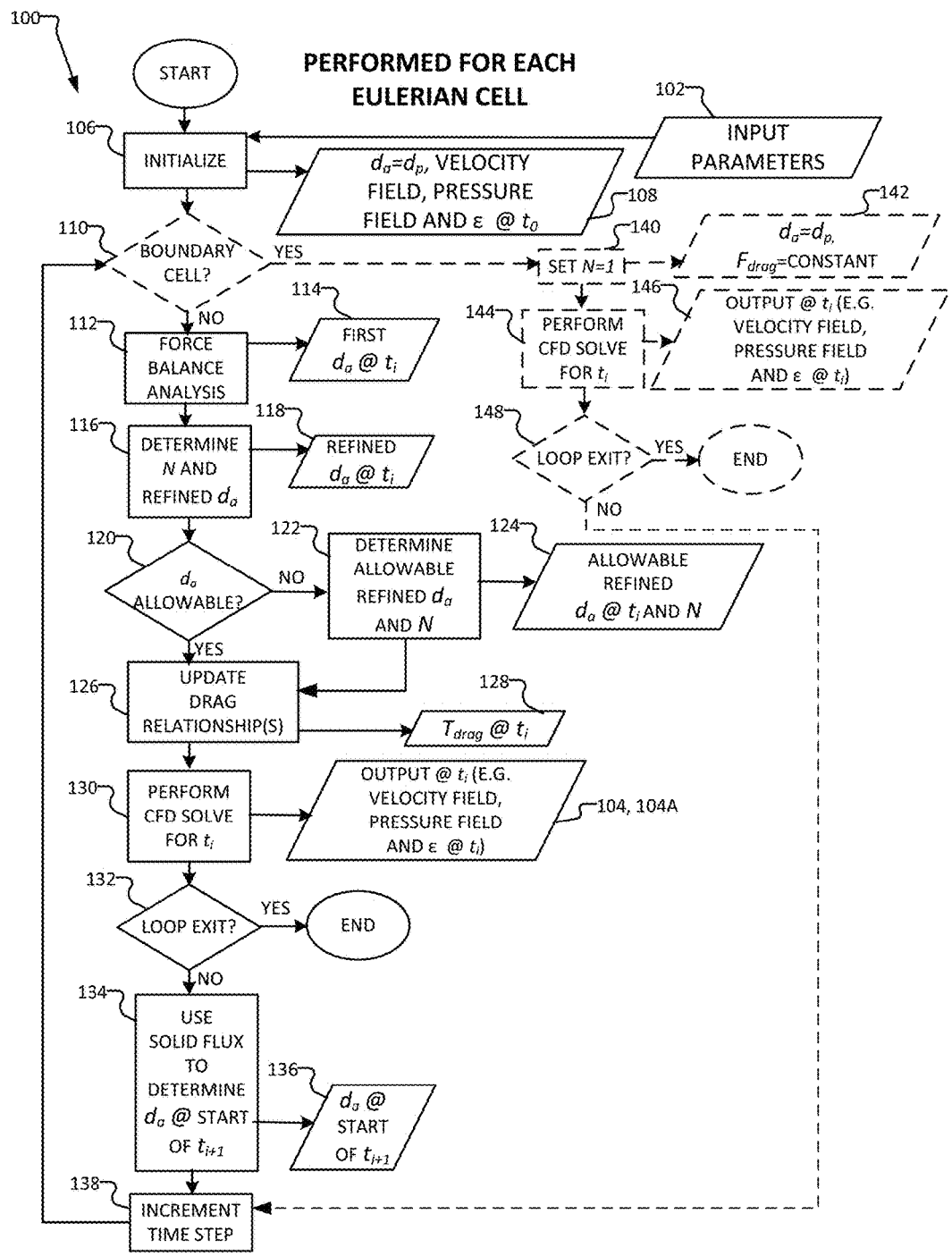
FIG. 1 schematically depicts a computer-implemented method for modeling a fluidized bed using an Eulerian-Eulerian framework according to a particular embodiment.

FIG. 1 schematically illustrates a computer-implemented method 100 for modeling a fluidized bed using an Eulerian-Eulerian framework according to a particular embodiment. Method 100 is performed by a computer system using suitably configured software, such as computer system 500 shown in FIG. 10, for example. Eulerian discretization involves dividing the space to be modelled into discrete computational cells or Eulerian cells. The FIG. 1 method 100 may be performed for each such Eulerian cell. Method 100 generally involves: obtaining a set of input parameters 102 which characterize the fluidized bed at an initial time step $t_0$; using a computer-implemented method to model the evolution of the two phases of a fluidized bed over a series of discrete time steps $t_i$ (i=1, 2, 3 ...) after the initial time step $t_0$; and determining a set of model predictions 104 for each of the series of time steps. In some embodiments, the fluidized bed modelled by method 100 may comprise a fluidized bed used in a FCC system, although this is not necessary and method 100 may be used to model fluidized beds used in other system and/or processes. In some embodiments, the particles in the fluidized bed modelled by method 100 may comprise or consist of Geldart group A particles, although this is not necessary and method 100 may be used to model gas/solid mixtures comprising additional or alternative types of particulates.

Input parameters 102 may comprise, by way of non-limiting example, characteristics of the gas and the solid present in the fluidized bed and characteristics of fluidized bed itself. Input parameters 102 may generally comprise information used to define or otherwise specify a fluidized bed and its constituent components in a manner that permits a computer system to implement method 100. By way of non-limiting example, in some embodiments, input parameters 102 may comprise: a gas density $p_g$, a gas viscosity, a particulate diameter $d_p$, physical boundaries of the vessel in which the fluidized bed is located, initial gas velocity $\vec{V}_g$ at $t_0$ for each Eulerian cell to provide an initial gas velocity field at $t_0$, initial particle velocity $\vec{V}_s$ at $t_0$ for each Eulerian cell to provide an initial particulate velocity field at $t_0$, initial granular temperature θ at $t_0$ to provide estimates for particle fluctuation velocity, initial gas pressure at $t_0$ for each Eulerian cell to provide an initial gas pressure field, initial particulate pressure at $t_0$ for each Eulerian cell to provide an initial particulate pressure field, an initial solid fraction $\varepsilon_s$ at $t_0$ for each Eulerian cell, an initial voidage $\varepsilon_g$ at $t_0$ for each Eulerian cell (it being understood that $\varepsilon_s+\varepsilon_g=1$) and/or the like.

Input parameters 102 are shown as being obtained in an initialization block 106. Input data 102 (or various portions thereof) may be obtained in block 106 by any suitable technique. By way of non-limiting example, input parameters 102 may be input to a computer system implementing method 100 by a user who may interact with a suitably configured user interface and/or software application, input parameters 102 may be accessed by the computer system implementing method 100 from a memory accessible to the computer system, input parameters 102 may be communicated to the computer system implementing method 100 by one or more suitable communication interfaces (e.g. over a computer network), from another software application or computer system and/or the like.

The method 100 model predictions 104 comprise, for each of a series of discrete time steps $t_i$ (i=1, 2, 3 . . . ), a set of parameters for each Eulerian cell. In the particular case of the illustrated embodiment of method 100, model predictions 104 may comprise: a gas velocity $\vec{V}_g$ at each time step $t_i$ for each Eulerian cell to simulate the evolution of a gas velocity field over the series of time steps, a particle velocity $\vec{V}_s$ at each time step $t_i$ for each Eulerian cell to simulate a particulate velocity field over the series of time steps, a granular temperatures θ of the solid phase which represents a fluctuation velocity, a gas pressure at each time step $t_i$ for each Eulerian cell to simulate an evolution of a gas pressure field over the series of time steps, a particulate pressure at each time step $t_i$ for each Eulerian cell to simulate an evolution of a particulate pressure field over the series of time steps, a solid fraction $\varepsilon_s$ at each time step $t_i$ for each Eulerian cell to simulate an evolution of the solid fraction over the series of time steps, an initial voidage $\varepsilon_g$ at each time step $t_i$ for each Eulerian cell to simulate an evolution of the voidage over the series of time steps (it being understood that $\varepsilon_s+\varepsilon_g=1$ at each time step $t_i$) and/or the like. The method 100 model predictions 104 are available to the computer system implementing method 100 and may be stored to a memory accessible to the computer system implementing method 100 and/or may be output to a user of the computer system implementing method 100 and/or to another computer system which may be in communication with the computer system implementing method 100. Such users or computer systems may use model predictions 104 for further analysis, decision making, configuration of the fluidized bed and/or the like.

As discussed above, method 100 of the illustrated FIG. 1 embodiment begins in an initialization block 106. Initialization block 106 involves obtaining input parameters 102 and determining a set of block 106 output 108. In this description, data may be referred to as being "output" from a particular step or block of a method (e.g. data 108 may be referred to as being the block 106 output 108). Unless the context dictates otherwise, such use of the term "output" (or similar terms) may involve the physical or electronic output of data does not require that such data actually be physically or electronically output from the computer system implementing the particular method. Further, it should be understood that any data determined or output by a particular step or block of a method described herein may be saved in a memory accessible to the computer system implanting method 100 and/or is otherwise available for use in any subsequent step or block of the method.

Recalling that method 100 is performed for each Eulerian cell, the block 106 output 108 of the FIG. 1 embodiment comprises: an initial gas velocity $\vec{V}_g$ at $t_0$ for a particular Eulerian cell, an initial particle velocity $\vec{V}_s$ at $t_0$ for the particular Eulerian cell, an initial gas pressure at $t_0$ for the particular Eulerian cell, an initial particulate pressure at $t_0$ for the particular Eulerian cell, an initial solid fraction $\varepsilon_s$ at $t_0$ for the particular Eulerian cell, an initial voidage $\varepsilon_g$ at $t_0$ for the particular Eulerian cell (it being understood that $\varepsilon_s+\varepsilon_g=1$). The block 106 initialization of the FIG. 1 embodiment also comprises setting an agglomerate diameter $d_a$ for each Eulerian cell to be equal to a particulate diameter $d_p$ (setting $d_a=d_p$). The agglomerate diameter $d_a$ is a parameter used in the method 100 model and is explained in more detail below. In some circumstances (e.g. where particular data is provided as part of input parameters 102), the determination of some or all of output 108 in block 106 is trivial. For brevity, unless the context dictates otherwise, the remainder of this description describes method 100 without expressly specifying that the method 100 steps are performed for a particular Eulerian cell.

After initialization, method 100 proceeds to optional block 110 which involves an inquiry into whether the particular cell being evaluation in method 100 is on a boundary of the fluidized bed. For the time being, it will be assumed that the block 110 inquiry is negative and that method 100 proceeds (via the block 110 NO branch) to block 112.

Figure 2:
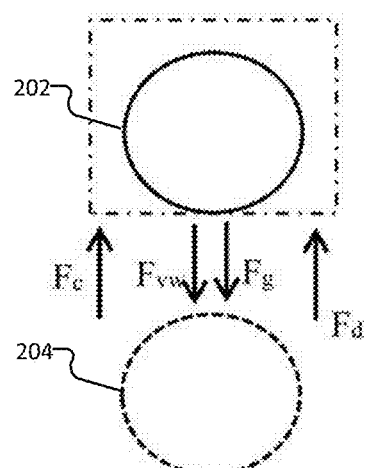
FIG. 2 is a schematic depiction of the forces used in a force balance model which may be used in the FIG. 1 method according to a particular embodiment.

Block 112 comprises performing a force balance (FB) analysis to predict the formation of agglomerates and to determine an agglomerate diameter $d_a$ that may be then be used to modify one or more drag term(s) used in one or more conservation of momentum relationship(s) used by a CFD solver and/or to otherwise modify the drag relationship(s) used by the CFD solver, as explained in more detail below. A particular embodiment of the block 112 force balance model is now described. In some embodiments a Kinetic Theory of Granular Flow (KTGF), instead of an elastic assumption, is used in block 112 to determine a collisional force ($F_c$). The basis of the block 112 approach in accordance with this particular embodiment is shown in FIG. 2 and comprises simulating a force balance over a control volume for two particles 202, 204 of the same size colliding with each other. The forces considered according to the particular embodiment comprise collisional ($F_c$), van der Waals ($F_{vw}$), gravity ($F_g$) and drag ($F_d$).

Drag Force ($F_d$)

In a system containing numerous particles, such as a fluidized bed, the drag forces acting on particles are affected by the voidage. For drag, the force acting on particles in a computational (Eulerian) cell inside a fluidized bed can be represented for low Reynolds numbers by:

$$\vec{F_d} = C_d \frac{1}{2} \rho_g \varepsilon_g |\vec{V_g} - \vec{V_s}|(\vec{V_g} - \vec{V_s})\frac{\pi}{4}d_p^2 \varepsilon_g^{-2.65} \quad (1)$$

where $\rho_g$ is the gas density, $\varepsilon_g$ the voidage, $\vec{V_g}$ and $\vec{V_s}$ are the gas and particle velocities, $d_p$ the particle diameter and $C_d$ is a drag coefficient which may be provided by $$C_d = \frac{24(1 + 0.15(\varepsilon_g \cdot Re_p)^{0.687})}{\varepsilon_g \cdot Re_p} \quad (2)$$

with the particle Reynolds number defined as:

$$Re_p = \frac{d_p \rho_g |\vec{V_s} - \vec{V_g}|}{\mu_g} \quad (3)$$

The original particles and agglomerates that form based on the force balance approach may be treated as if they are spherical. Agglomerates may be assumed in block 112 to form a single non-porous solid spherical particle. When agglomerates are formed, two types of voidage appear through which the gas could flow. The space between the particles in each agglomerate may create internal voidage and the outer space surrounding the agglomerates may constitute external voidage, through which interstitial gas may pass. Both types of voidage can affect the drag force on agglomerates. The effect of external voidage, which creates space for interaction between particles/agglomerates and surroundings in a fluidized bed, is taken into account in the determination of the drag force in equation (1) by the factor $\varepsilon_g^{-2.65}$. The internal voidage allows some gas to flow through the agglomerate, hence reducing the drag force. A factor $\Omega$ may be used to account for the effect of the interior flow through the porous structure in reducing the drag force. The factor $\Omega$ may be defined as the ratio of hydrodynamic resistance experienced by a permeable sphere to hydrodynamic resistance experienced by an impermeable sphere of the same radius. Using the Brinkman's extension of Darcy's law for low Reynolds numbers, the factor $\Omega$ may be derived according to:

$$\Omega = \frac{2\gamma^2 \left(1 - \left(\frac{\tanh \gamma}{\gamma}\right)\right)}{2\gamma^2 + 3\left(1 - \left(\frac{\tanh \gamma}{\gamma}\right)\right)} \quad (4)$$

where $\gamma$ may be given by:

$$\gamma = \frac{d_a}{\left(2\sqrt{\frac{d_p^2}{72}\left[3 + \frac{4}{1-\varepsilon_i}\sqrt[3]{\frac{8}{1-\varepsilon_i}}\right]}\right)} \quad (5)$$

Figure 3:
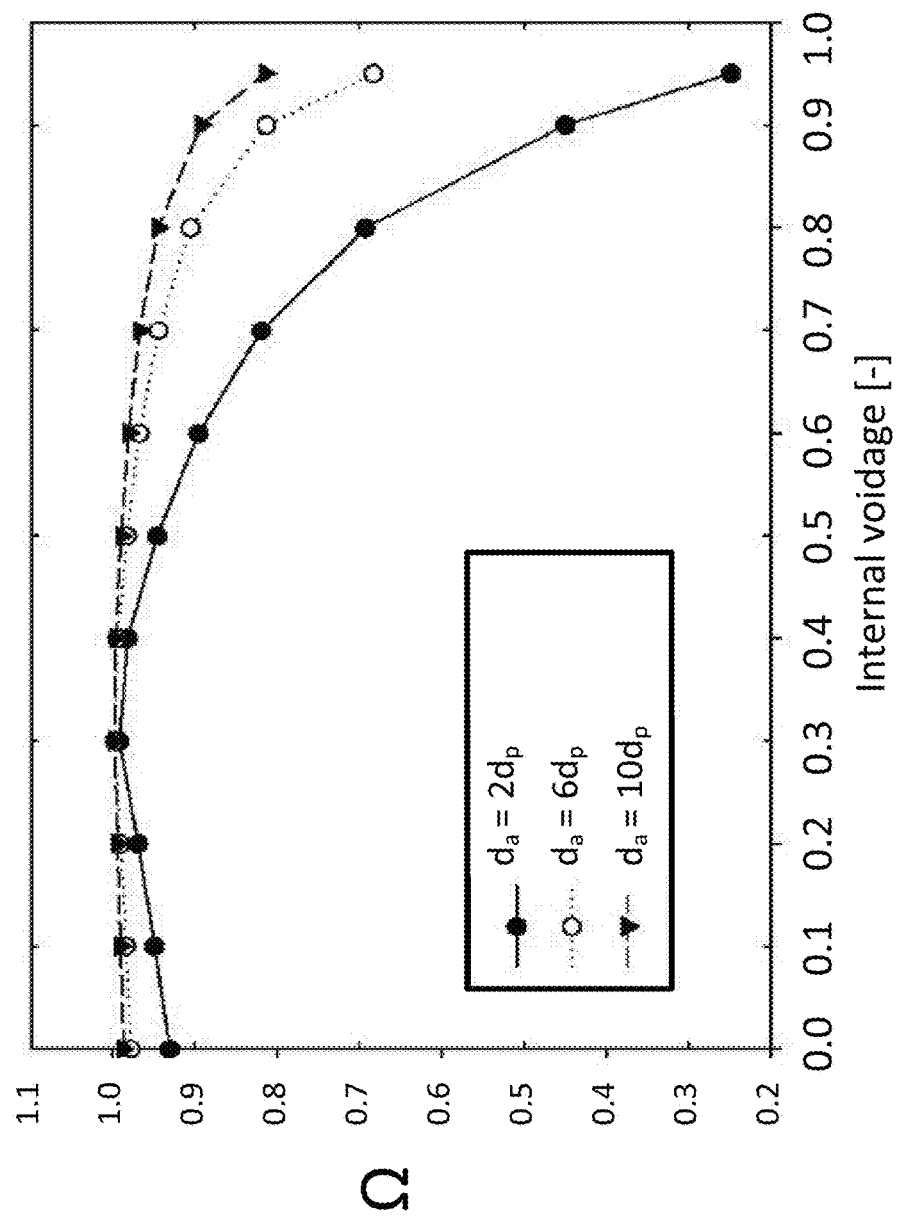
FIG. 3 is a plot of a drag force correction factor ($\Omega$) vs. internal voidage ($\varepsilon_i$) for three different agglomerate diameters with particle diameter of $d_p=100$ μm, based on equations (4) and (5) described below.

In equation (5), $d_a$ is the agglomerate diameter and $\varepsilon_i$ is the internal voidage. FIG. 3 shows a number of plots which illustrate the changes in the equation (4) factor $\Omega$ with internal voidage $\varepsilon_i$ for three values of $d_a$ and a particle diameter of $d_p$=100 μm. For small agglomerates ($d_a$<6$d_p$), FIG. 3 shows that the drag correction factor $\Omega$ starts to decrease when the internal voidage $\varepsilon_i$ exceeds 0.5. However, when agglomerates grow in size, the drag correction factor 12 does not show a sharp decrease with increasing internal voidage $\varepsilon_i$, except at higher $\varepsilon_i$.

Depending on the arrangements of particles in an agglomerate, the internal voidage $\varepsilon_i$ could vary considerably. There is no definitive approach to determine how the particles would aggregate to build agglomerates in a fluidized bed. Considering particles and agglomerates to be spherical and utilizing a random style of particle packing, the voidage $\varepsilon_i$ inside the packing may be considered to be likely to be between about 0.4 and 0.5, close to random loose-packed values. For these values, the drag correction factor, $\Omega$, is very close to 1.0, implying negligible reduction in drag force as a result of flow through internal pores. Recent numerical studies on the effect of Reynolds number (based on particle diameter, gas properties and superficial gas velocity) on drag reduction factor in a particle aggregate of four particles show that the flow rate of gas through the internal voidage increases to a considerable extent for Reynolds numbers greater than 10. However, referring to FIG. 3, when the agglomerates grow in size, there is more resistance to flow through internal pores, resulting in less drag reduction. Consequently, in some embodiments, the drag reduction factor $\Omega$ caused by the effect of internal voidage may be assumed to be unity ($\Omega$=1), which is appropriate for low particle Reynolds numbers and large agglomerates as described above. In some embodiments, this assumption is not necessary and other values of the drag reduction factor $\Omega$ may be used. Unless the context dictates otherwise, the voidage referred to in the remainder of this description may be assumed to be the external voidage, without loss of generality.

Collisional Force (Fc)

For two particles 202, 204 colliding with each other (see FIG. 2), conservation of total momentum yields:

$$m_1 \vec{V'_1} + m_2 \vec{V'_2} = m_1 \vec{V_1} + m_2 \vec{V_2} \quad (6)$$

$$m_1 \vec{V_1} = m_1 \vec{V'_1} - \vec{J} \quad (7)$$

$$m_2 \vec{V_2} = m_2 \vec{V'_2} + \vec{J} \quad (8)$$

where the indices 1 and 2 correspond to the two particles (e.g. particles 202, 204 of FIG. 3), $m_1$ and $m_2$ are their masses, $\vec{V_1}$ and $\vec{V_2}$ are their velocities before collision, $\vec{V'_1}$ and $\vec{V'_2}$ are the velocities after collision and $\vec{J}$ is the impulse of the force exerted by particle 1 on particle 2. After a dissipative collision, part of the energy of the relative motion is lost. Therefore, after contact the relative velocity is only partly restored. The coefficient of restitution, e, quantifies this phenomenon:

$$e = -\frac{(\vec{V'_1} - \vec{V'_2}) \cdot \vec{n}}{(\vec{V_1} - \vec{V_2}) \cdot \vec{n}} \quad (9)$$

where $\vec{n}$ is a unit normal vector that is normal to the lateral surfaces of both bodies at the point of contact. The velocity vectors may, in some embodiments, be assumed to be collinear with the normal vector $\vec{n}$ when contact occurs and these vectors may be assumed, in some embodiments, to be constant for the duration of the collision. In an Eulerian-Eulerian modeling framework, particles are assumed to have the same properties. Therefore, the two colliding particles may be assumed to have the same diameter and equal velocity magnitudes before collision ($m_1=m_2=m$, $\vec{V}_1=-\vec{V}_2=\vec{V}$). Combining equations (6) to (9) and solving for the impulse $\vec{J}$ yields:

$$\vec{J} = m(1+e)\vec{V} \quad (10)$$

Since impulse is defined as the integral of force with respect to time, it follows that:

$$\vec{F_c} = \frac{\vec{J}}{T_c} \quad (11)$$

where $T_c$ is a particle-particle collision duration, which, in some embodiments, may be estimated utilizing Hertzian theory to be:

$$T_c = 3.21 \times \left(\frac{\pi d_p^3 \cdot \rho_p}{8 \cdot \sqrt{d_p \cdot \left(\frac{E}{2.(1-\theta)^2}\right)}}\right)^{0.4} |\vec{V}_{imp}|^{-0.2} \quad (12)$$

where $d_p$ is the particle diameter, $\rho_p$ is the particle density, $E$ is the Young's modulus, $\theta$ is the Poisson ratio and $\vec{V}_{imp}$ is the impact velocity. Since, the impact velocity is not available from continuum equations, the granular temperature may serve as a substitute for impact velocity in some embodiments, and equation (12) may be replaced by:

$$T_c = 3.21 \times \left(\frac{\pi d_p^3 \cdot \rho_p}{8 \cdot \sqrt{d_p \cdot \left(\frac{E}{2.(1-\theta)^2}\right)}}\right)^{0.4} (\sqrt{3.\theta})^{-0.2} \quad (13)$$

where $\theta$ is the granular temperature defined by:

$$\theta = \frac{1}{3}|\vec{V'_s}|^2 \quad (14)$$

with $V'_s$ being the fluctuation velocity of the solid phase which replaces $\vec{V}$ in equation (10). The collisional force may then be determined by combining equations (10) to (14) and re-arranging the terms to obtain:

$$\vec{F_c} = \frac{\vec{J}}{T_c} = 0.052\pi\rho_p d_p^3 \left(\frac{8\cdot\sqrt{d_p\cdot\left(\frac{E}{2.(1-\theta)^2}\right)}}{\pi\rho_p d_p^3}\right)^{0.4} (1+e)\frac{(\sqrt{3.\theta})^{1.2}}{|\vec{V_s}|}\vec{V_s} \quad (15)$$

Gravitational/Buoyancy Force ($F_g$)

The net gravity force, including consideration of buoyancy, may be given by:

$$\vec{F_g} = \frac{\pi}{6}(\rho_p - \rho_g)d_p^3 \vec{g} \quad (16)$$

where $\vec{g}$ is the acceleration due to gravity which acts downwardly.

Van Der Waals Force ($F_{vw}$)

In particular embodiments, the dominant cohesive force between particles is assumed to be the van der Waals force, which for two identical smooth spheres can be expressed as:

$$F_{VW} = \frac{A d_p}{24\delta^2} \quad (17)$$

where A is the Hamakar constant (related to the type of material) and $\delta$ is the distance between particle surfaces. The Hamakar constant is a complex function of several material and interstitial fluid properties (temperature, dielectric constant of particles, index of refraction of particles and Planck and Boltzmann constants, among others). It is generally assumed to be of order $10^{-19}$ to $10^{-23}$ J, with values between $10^{-19}$ and $10^{-20}$ J common for Geldart Group A particles. In some embodiments, any suitable value of the Hamakar constant can be used in block 112. In some embodiments, a value of between $10^{-19}$ and $10^{-20}$ J may be used. The Lifshitz theory may also be used to determine this constant in some embodiments.

The distance between adjacent particles ($\delta$) varies during fluidization and has a profound effect on the van der Waals force. The van der Waals force may be considered to be essentially negligible at moderate or long inter-particle distances, and only significant at short range. During fluidization, particles contact each other at very short range and travel between contacts (moderate distances from each other). Hence cohesion only plays a role when particles are close to one another, which is why estimates of the minimum separation distances may be used when modeling cohesive forces. Changing the separation distance between particles ($\delta$) in the range between 0.4-4 nm results in variation in cohesive forces by a factor of 100, showing the importance of the distance between particles ($\delta$) in determining the van der Waals force.

Figure 4:
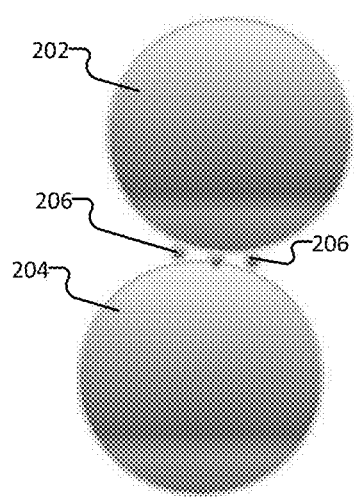
FIG. 4 schematically depicts a contact event between two-coated cohesive particles and location of guest particles.

In some embodiments, surface asperities may be taken into account when assessing the van der Waals force in block 112. The presence of surface asperities, as well as their shape and distribution on the outer surface of particles, may have a significant effect on cohesive forces because they determine the closest approach of a pair of particles. Some authors have asserted that the effect of short-range attractive interactions drives structure formation and that the average number of particles in a cluster is directly related to the cohesive strength. In some embodiments, asperities may be modelled based on an assumption that one or more "guest" particles (asperities) are present on a "host" particle and that the host particle (together with its guest particles) interacts with a second particle. This geometry is shown in FIG. 4, where particle 202 is shown as host particle with three asperities 206 interacting with second particle 204. Such a model may be utilized to derive an equation for determining the van der Waals force, taking into account also the effect of guest-particle radius and Surface Area Coverage (SAC) which is the fraction of particle surface occupied by asperities. In some embodiments, the FIG. 4 contact geometry may be used with the assumption that the guest particles (asperities) 206 residing on the surface of the host particle 204 are hemispherical in shape. The van der Waals force, which accounts for both particle-particle and particle-asperity forces, may be determined by:

$$F_{vw1} = \frac{A}{12Z_0^2}\left[\frac{3d_{as}d_p}{d_{as}+d_p} + \frac{d_p}{2\left(\frac{H_0}{Z_0}\right)^2}\right] \quad (18)$$

where $Z_0$ is the minimum separation distance, which may be set to a suitable constant (e.g. in some embodiments, may be set in a range of 0.2-10 nm or in a range of 0.4-4 nm) as a distance of closest approach between solid surfaces (particles and/or asperities), $d_{as}$ and $d_p$ are respectively asperity and particle diameters, and $H_0$ is a particle-particle distance which may be given by:

$$H_0 = \sqrt{(d_p+d_{as})^2 - \frac{1.21}{SAC}d_{as}^2} - d_p \quad (19)$$

where SAC is the surface-area-coverage. With this formulation, the total van der Waals force may then be estimated by:

$$F_{vw} = F_1 + F_{vw\_aa} \quad (20)$$

where $F_{vw\_aa}$ is the van der Waals force magnitude for asperity-asperity contacts. The direction of the total van der Waals force $F_{vw}$ is along the line passing through particle centers and always cohesive. It may be observed that accounting for the van der Waals force between asperities does not affect the distances used to determine the particle-particle and particle-asperity van der Waals forces in equation (18). Consequently, the van der Waals force from equation (2.18) can still be used to determine the cohesive forces between particles and particle-asperities. Assuming that each of the asperities (e.g. three asperities) shown in FIG. 4 is in contact with asperities close to them, $F_{vw\_aa}$ for the system portrayed in FIG. 4, may be given by $$F_{vw\_aa} = \frac{3Ad_{as}}{24Z_0^2} \quad (21)$$

Figure 5:
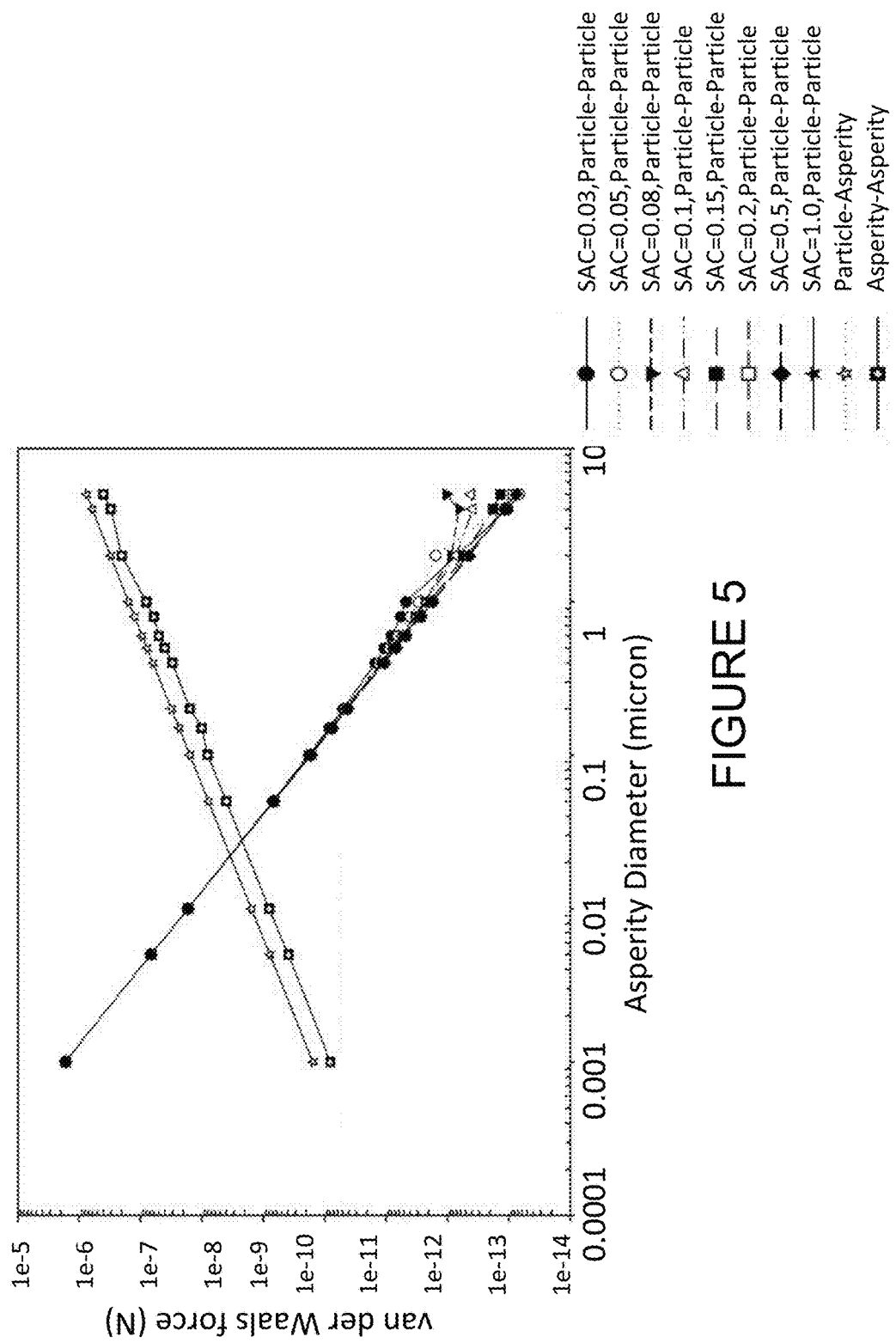
FIG. 5 shows plots of the changes in van der Waals force with asperity diameter for various parameters.

To analyze the effect of asperities on van der Waals forces for equations (18)-(21), a sample case was considered for determination of the van der Waals force, with results depicted in FIG. 5 which provides a number of plots of the van der Waals force versus asperity diameter for different SAC values. In the FIG. 5 plots, $d_p=100$ μm, $A=10^{-19}$ J, $Z_0=0.4$ nm, the weight of the particles is $8\times10^{-9}$N and $\rho_p=1560$ kg/m³. In the FIG. 5 plots, the asperity-asperity van der Waals force was determined in accordance with equation (21), the particle-asperity van der Waals force was determined from the left hand term on the right hand side of equation (18) and the particle-particle van der Waals force was determined using the right hand term on the right hand side of equation (18). The particle-particle van der Waals force dominates on the left-hand portion of the FIG. 5 plots—e.g. where the asperities are smaller than 0.02 μm. The particle-asperity and asperity-asperity van der Waals forces dominate on the right-hand portion of the FIG. 5 plots—e.g. for asperity diameters >0.02 μm. Increasing SAC results in slightly less significant particle-particle contact only for large asperity diameters. Otherwise the SAC plays a relatively minor role. FIG. 5 shows that asperity diameter has an important influence on the van der Waals forces determined in accordance with equations (18)-(21).

Figure 6A:
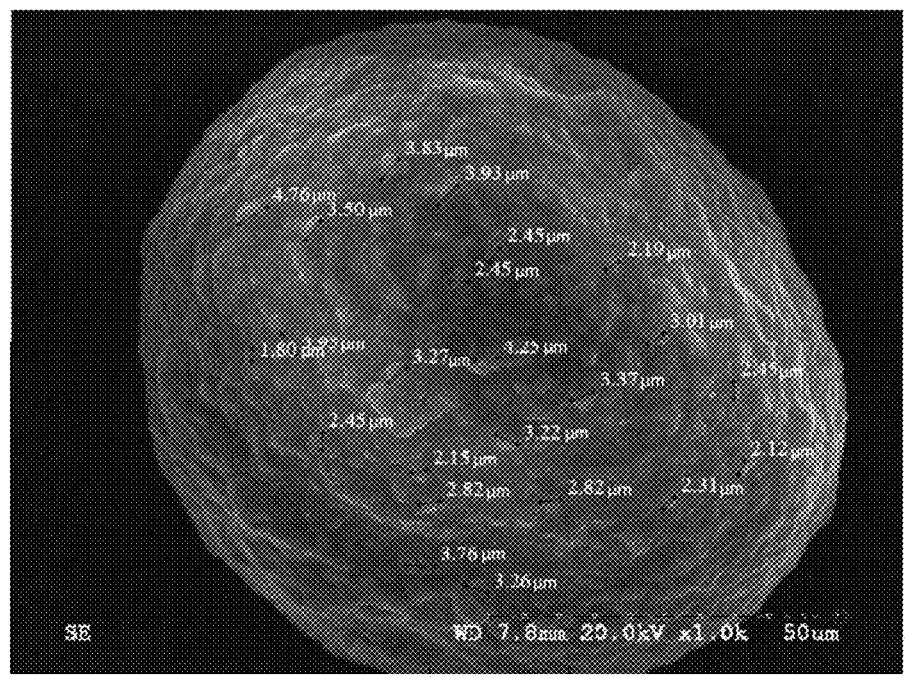
FIGS. 6A and 6B are scanning electron microscope (SEM) images of whole FCC catalyst particles (FIG. 6A) and close-up (FIG. 6B) for particle diameter of $d_p=100$ μm.
Figure 6B:
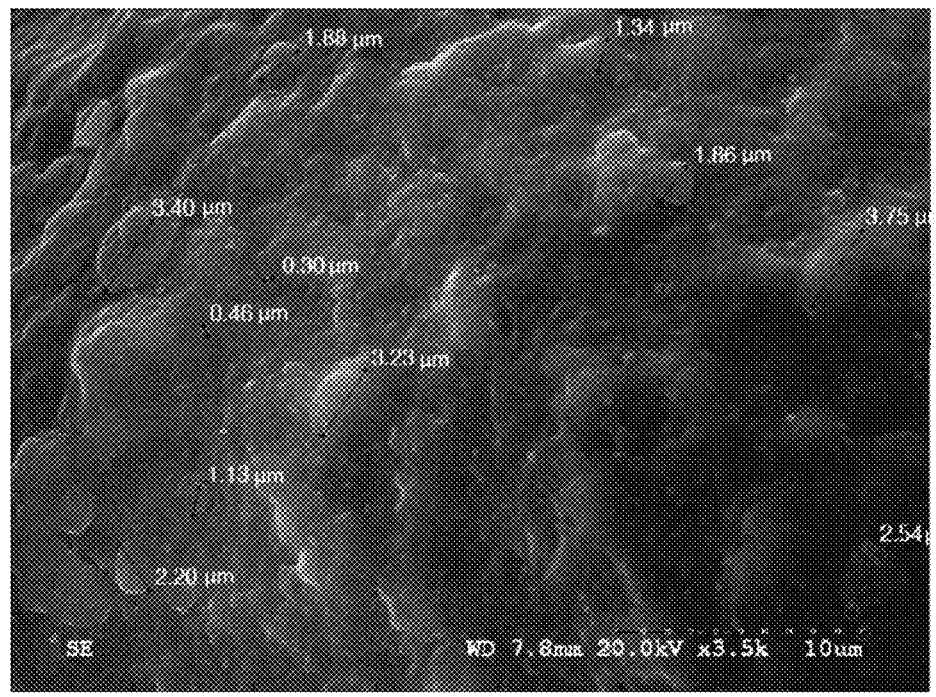

Different values have been reported in the literature for asperity radii ranging from 0.1 to 0.5 μm for very small (1 μm) particles to particle diameters of tens of microns in diameter. The inventors used captured Scanning Electron Microscopic (SEM) images of typical spent-FCC catalyst particles with a mean particle diameter of $d_p=98$ μm and particle density of $\rho_p=1560$ kg/m³. FCC catalyst particles having these properties are representative of FCC catalyst particles used in commercial FCC reactors. SEM images were taken of particles ranging from 60 to 100 μm in diameter. A pair of exemplary SEM images is shown in FIGS. 6A and 6B. An interactive MATLAB utility called "Image measurement utility" was utilized to measure the distance between points in SEM images after calibration based on the scale of each image. From such SEM images, it was concluded that asperities cover almost all of the surface of particles (implying SAC values close to 1.0), with asperity diameters ranging from approximately 0.5 μm-5 μm, much larger than values previously reported in the literature. Taking the 0.5 μm-5 μm diameter asperity size range and SAC=1.0 into account and referring to the plots of FIG. 5, it can be observed that the magnitude of particle-asperity and asperity-asperity van der Waals forces are significantly larger than the particle-particle van der Waals force. Therefore, for Geldart group A particles used in the fluidized beds of typical FCC processes, the asperity diameter may typically fall into the range of 0.5 μm-5 μm, and the particle-particle contribution does not play a significant role in determining the total van der Waals force.

With topographic information, such as asperity diameter and surface-area-coverage, available on the particles of a fluidized bed system, equations (18)-(21) and/or similar models proposed by other research groups can be used to estimate the total van der Waals force. In some embodiments, to simplify the incorporation of these models and the total van der Waals force prescribed by such models into the block 112 force balancing analysis, equation (17) may be used to map from a more rigorous cohesion model, which includes the effects of asperities, to a simpler model for smooth surfaces. This mapping may be accomplished, in some embodiments, by taking the cohesive (van der Waals) force at closest approach, and then finding the corresponding separation distance (δ) using equation (17). In some embodiments, based on this mapping approach for typical Geldart group A FCC particles of the type described herein, the arithmetic mean-average of asperity-asperity and asperity-particle van der Waals forces in the FIG. 5 plots may be considered for the asperity diameter range of 0.5 μm-5 μm to determine a corresponding separation distance, (δ), between 1.0-1.5 nm for particle diameters in the range of 60 μm-100 μm:

$$F_{VW} = \frac{Ad_p}{24\delta^2} \quad d_p = 60 \text{ μm} \rightarrow \delta = 1.0 \text{ nm}$$
$$d_p = 100 \text{ μm} \rightarrow \delta = 1.5 \text{ nm}$$

In some embodiments, this simple equation, with the effect of particle asperities included, may be used in block 112 to estimate the van der Waals force.

Analysis of Force Vectors

In some embodiments, the magnitudes and directions of at least some of the force vectors described above (e.g. $\vec{F}_g$, $\vec{F}_{vw}$, $\vec{F}_d$, $\vec{F}_c$) are determined and analyzed to determine the effect of these forces on agglomerate formation. In some embodiments, after being formed, agglomerates are assumed to be held together (i.e. to not break up), although this assumption is not necessary. In some embodiments, if a balance of forces (e.g. $\vec{F}_g$, $\vec{F}_{vw}$, $\vec{F}_d$, $\vec{F}_c$) is not present during a collision, it is assumed that colliding particles or agglomerates bounce back, with no breakup of colliding agglomerates, although this assumption is not necessary.

Figure 7:
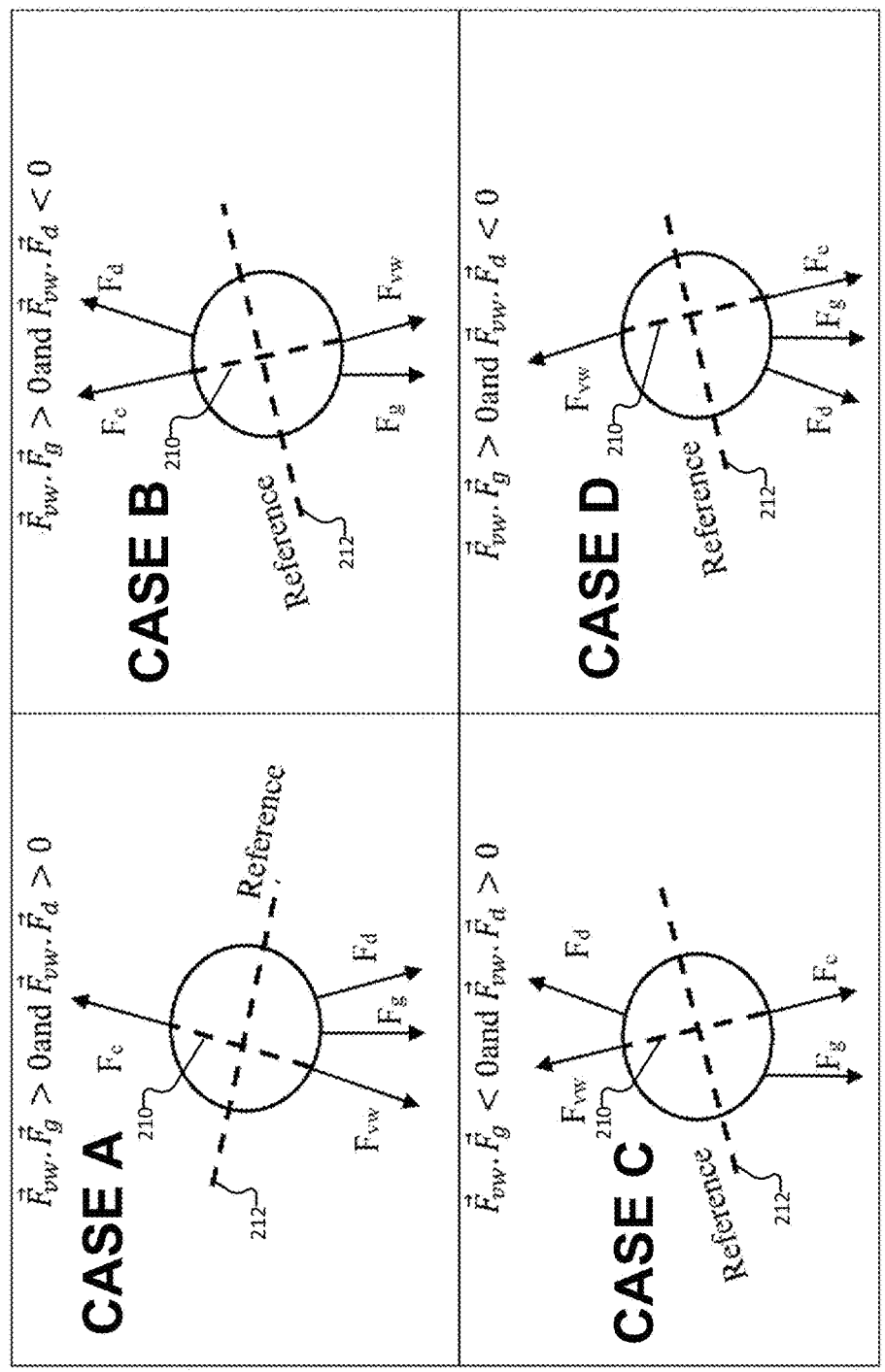
FIG. 7 schematically depicts a number of possible force scenarios which can result in agglomerate formation, depending on the magnitude and direction of the force vectors which may be used in the FIG. 1 method according to a particular embodiment.

In some embodiments, the block 112 force balance procedure comprises determining an agglomerate diameter $d_a$ for the time step $t_i$ of interest and for the Eulerian cell of interest, where determining the agglomerate diameter $d_a$ comprises: assigning the cell to be in a particular one of a finite plurality of classification cases based on the directions of a plurality of forces (which comprises at least some of the above-described forces ($\vec{F}_g$, $\vec{F}_{vw}$, $\vec{F}_d$, $\vec{F}_c$)); and determining the agglomerate diameter $d_a$ in accordance with a procedure (e.g. one or more equation(s) and/or step(s)), where the agglomerate diameter determination procedure depends on the particular one of the finite plurality of classification cases to which the cell is assigned. FIG. 7 schematically depicts a plurality of classification cases (cases A, B, C and D) which may be used to determine the agglomerate diameter determination procedure according to a particular embodiment.

possible classification scenarios (cases A, B, C and D) when considering the vector form of drag force $\vec{F}_d$, collision force $\vec{F}_c$, gravitational force $\vec{F}_g$ and van der Waals force $\vec{F}_{vw}$. Both vertical and horizontal components of these forces are considered when analyzing the forces for the purposes of classification. The directions and sizes of the vectors shown in FIG. 7 are arbitrary. Given that van der Waals and collision forces $\vec{F}_{vw}$, $\vec{F}_c$ always act in opposite directions, they can be utilized to construct a first axis 210. A reference axis 212 may then be constructed to be perpendicular to the first axis 210. First axis 210 and reference axis 212 are shown in dashed lines for each of the FIG. 7 cases. Axes 210, 212 may be used as a basis for discriminating between the FIG. 7 cases A, B, C and D. If any two or three of the forces being considered (e.g. $\vec{F}_g$, $\vec{F}_{vw}$, $\vec{F}_d$, $\vec{F}_c$) fall on the same side of reference axis 212, their effects may be considered to be aggregated, whereas if such forces are on opposite sides of reference axis 212, their effects may be considered to oppose one another. Forces on the same side of reference axis 212 as the van der Waals force $\vec{F}_{vw}$ may be considered to contribute to agglomerate formation, whereas forces on the opposite side of reference axis 212 from the van der Waals force 212 may be considered to resist formation of agglomerates. This approach for the two-dimensional coordinates shown in the FIG. 7 schematic illustration can be represented, considering the vector form of the forces, by:

$$\vec{F} = F_x \cdot \vec{i} + F_y \cdot \vec{j} \qquad (22)$$

The $F_x$ and $F_y$ components for each force (e.g. $\vec{F}_g$, $\vec{F}_{vw}$, $\vec{F}_d$, $\vec{F}_c$), which may, in some embodiments, be determined, for the cell under consideration, in accordance with equations (1), (15), (16) and (17) described above and shown in Table 1 below.

TABLE 1

Equations for performing vector calculations

| | $F_x$ | $F_y$ |
|---|---|---|
| $\vec{F}_d$ | $0.125\pi C_d \rho_g \epsilon_g |\vec{V}_g - \vec{V}_s|(\vec{V}_{gx} - \vec{V}_{sx})\epsilon_g^{-2.65} d_a^2$ | $0.125\pi C_d \rho_g \epsilon_g |\vec{V}_g - \vec{V}_s|(\vec{V}_{gy} - \vec{V}_{sy})\epsilon_g^{-2.65} d_a^2$ |
| $\vec{F}_c$ | $0.052\pi \rho_p d_a^3 \left( \dfrac{4 \cdot \sqrt{d_p} \cdot (E/(2 \cdot (1-\vartheta^2)))}{\pi \rho_p d_a^3} \right)^{0.4} \times (1+e)(\sqrt{3\theta})^{1.2} \dfrac{\vec{V}_{sx}}{|\vec{V}_s|}$ | $0.052\pi \rho_p d_a^3 \left( \dfrac{4 \cdot \sqrt{d_p} \cdot (E/(2 \cdot (1-\vartheta^2)))}{\pi \rho_p d_a^3} \right)^{0.4} \times (1+e)(\sqrt{3\theta})^{1.2} \dfrac{\vec{V}_{sy}}{|\vec{V}_s|}$ |
| $\vec{F}_{vw}$ | $\left( \dfrac{-A d_p}{24 \delta^2} \right) \dfrac{\vec{F}_{cx}}{|\vec{F}_c|}$ | $\left( \dfrac{-A d_p}{24 \delta^2} \right) \dfrac{\vec{F}_{cy}}{|\vec{F}_c|}$ |
| $\vec{F}_g$ | 0 | $\dfrac{-\pi}{6}(\rho_p - \rho_g) d_a^3 \vec{g}$ |

Figure 8:
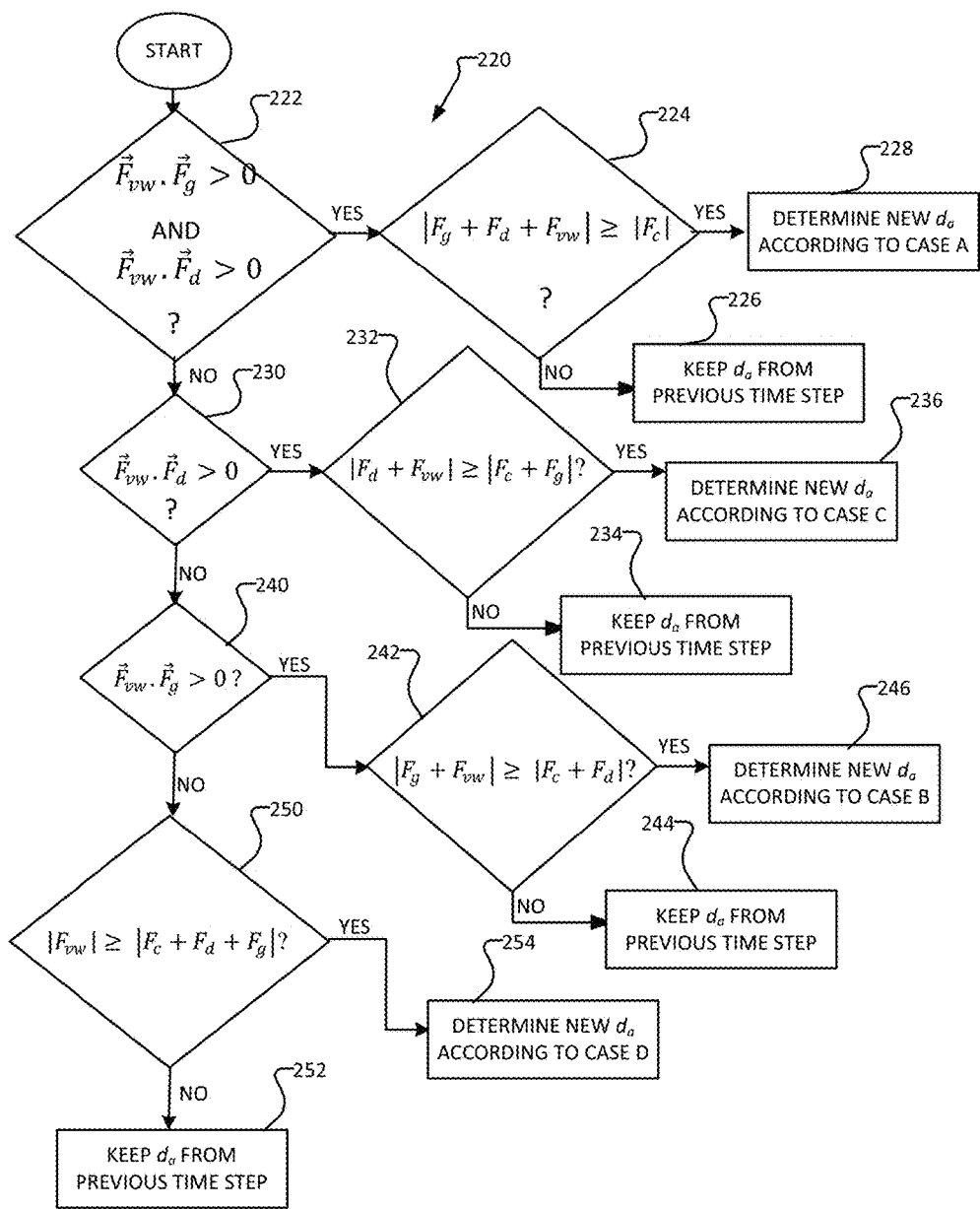
FIG. 8 is a schematic depiction of a method which may be used to determine whether an agglomerate should form and for determining the agglomerate diameter $d_a$ which may be used in the FIG. 1 method according to a particular embodiment.

Classification of a cell into one of the FIG. 7 cases depends on the directions and magnitudes of at least some of the forces ($\vec{F}_g$, $\vec{F}_{vw}$, $\vec{F}_d$, $\vec{F}_c$). FIG. 8 depicts a method 220 for determining an agglomerate diameter $d_a$ for the time step $t_i$ of interest and for the cell of interest according to a particular embodiment. The FIG. 8 method 220 implements the FIG. 7 classification scheme.

The FIG. 7 classification scheme is now described. Taking into account that the gravity force $\vec{F}_g$ always acts vertically downward and that the van der Waals and collision forces $\vec{F}_{vw}$, $\vec{F}_c$ always act in opposite directions, FIG. 7 depicts four Those skilled in the art will appreciate that the two-dimensional force components set out in Table 1 may be readily extended to three dimensions, it being noted that the gravitational force $\vec{F}_g$ has only one downwardly oriented component in both a 2D or 3D environment.

The primary particle diameter $d_p$ may be used to determine van der Waals force $\vec{F}_{vw}$, and the most recently determined agglomerate diameter $d_a$ (which may be determined in a preceding time step, as discussed in more detail below) may be utilized to estimate drag force $\vec{F}_d$, collision force $\vec{F}_c$ and gravity force $\vec{F}_g$. The dot product between van der Waals force $\vec{F}_{vw}$ and other forces may then be utilized to determine whether the forces in the cell of interest reinforce or oppose the van der Waals force $\vec{F}_{vw}$ with respect to reference axis 212 in FIG. 7, For instance, if $\vec{F}_{vw} \cdot \vec{F}_g < 0$, then the van der Waals force $\vec{F}_{vw}$ and gravitational force $\vec{F}_g$ are on opposite sides of reference axis 212, and the cell could be assigned to either case C or case D shown in FIG. 7. If $\vec{F}_{vw} \cdot \vec{F}_g < 0$ then drag force $\vec{F}_d$ and the van der Waals force $\vec{F}_{vw}$ are on opposite sides of reference axis 212, and so the cell would be assigned to case D in the FIG. 7 embodiment. The conditions representative of each of the FIG. 7 cases are shown at the top of the FIG. 7 rectangle corresponding to each case. Based on evaluation of these conditions, the cell is assigned to one of the FIG. 7 cases A, B, C or D.

After assigning the cell to be in a particular one of a finite plurality of classification cases (e.g. one of the FIG. 7 cases A, B, C and D) based on the directions and magnitudes of the plurality of forces (which comprises at least some of the above-described forces ($\vec{F}_g$, $\vec{F}_{vw}$, $\vec{F}_d$, $\vec{F}_c$)), the block 112 force balance procedure comprises determining the agglomerate diameter $d_a$ in accordance with a procedure (e.g. one or more equation(s) and/or step(s)), where the agglomerate diameter determination procedure depends on the particular one of the finite plurality of classification cases to which the cell is assigned. Determining whether or not an agglomerate can form in the time step $t_i$ of interest and, if so, the agglomerate diameter $d_a$, may be based on the absolute values of the sums of force vectors on opposing sides of reference axis 212. Such force vectors may comprise the vectors associated with at least some of the above-described forces ($\vec{F}_g$, $\vec{F}_{vw}$, $\vec{F}_d$, $\vec{F}_c$). If the absolute value of the sum of forces on a same side of reference axis 212 as the van der Waals force $\vec{F}_{vw}$ is larger than the absolute value of the sum of forces on the side of reference axis 212 opposite to that of the van der Waals force $\vec{F}_{vw}$, then a new agglomerate may be assumed to form. Otherwise, no agglomerate formation occurs and the agglomerate diameter determined in the preceding time step may be assumed to be conserved for the cell in consideration.

FIG. 8 schematically a method 220 which may be used to determine whether an agglomerate should form for a particular cell in a time step $t_i$ of interest and, if so, for determining the agglomerate diameter $d_a$ associated with the force balance block 112 of the FIG. 1 method 100 according to a particular embodiment. Method 220 is performed by a computer system having suitably configured software, such as computer system 500 shown in FIG. 10, for example. In block 222, method involves evaluating a pair of conditions based on $\vec{F}_g$, $\vec{F}_d$ and $\vec{F}_{vw}$. If the block 222 inquiry is positive, then the cell is assigned to case A of the FIG. 7 embodiment (where $\vec{F}_g$ and $\vec{F}_d$ are both on the same side of reference axis 212 as $\vec{F}_{vw}$) and method 220 proceeds to block 224. Block 224 involves comparing the absolute value of the sum of the forces $\vec{F}_g$, $\vec{F}_d$ and $\vec{F}_{vw}$ and the absolute value of the force $\vec{F}_c$ on opposing sides of reference axis 212. If the block 224 inquiry is negative, the computer system implementing method 220 determines that no agglomeration occurs in the time step $t_i$ and cell of interest and method 220 proceeds to block 226. Block 226 involves maintaining the agglomerate diameter $d_a$ determined in the preceding time step and outputting that agglomerate diameter $d_a$ as the block 112 output 114 (see FIG. 1). In the first iteration of block 112, block 226 may involve outputting $d_a = d_p$ (i.e. setting the agglomerate diameter $d_a$ to be the particulate diameter $d_p$). For reasons discussed further below, the output 114 of the method 100 force balance block 112 may be referred to as a "first" agglomerate diameter $d_a$.

If the block 224 inquiry is positive, the computer system implementing method 220 determines that agglomeration occurs in the time step $t_i$ and cell of interest, and method 220 proceeds to block 228. Block 228 comprises determining a new first agglomerate diameter $d_a$ for the time step $t_i$ and cell of interest and outputting that agglomerate diameter $d_a$ as the block 112 output 114 (see FIG. 1). The block 228 procedure for determining the first agglomerate diameter $d_a$ may involve solving a quadratic equation where the coefficients of the quadratic equation are based on the fact that the cell of interest has been assigned to class A of the FIG. 7 classification scheme. The block 228 procedure is described in more detail below.

Returning to block 222, if the block 222 inquiry is negative, then method 220 proceeds to block 230. Block 230 is analogous to block 222 described above in the sense that block 230 involves evaluating a condition based on at least some of the forces $\vec{F}_g$, $\vec{F}_d$ and $\vec{F}_{vw}$ (in the illustrated embodiment $\vec{F}_d$ and $\vec{F}_{vw}$). If the block 230 inquiry is positive, method 220 involves assigning the cell to case C of the FIG. 7 embodiment (where $\vec{F}_d$ is on the same side of reference axis 212 as $\vec{F}_{vw}$, but $\vec{F}_g$ is on the opposite side of reference axis 212 from $\vec{F}_{vw}$) and proceeding to block 232. Block 232 is analogous to block 224 described above in the sense that block 232 involves comparing the absolute value of the sum of the forces $\vec{F}_d$ and $\vec{F}_{vw}$ and the absolute value of the sum of the force $\vec{F}_c$ and $\vec{F}_g$ on opposing sides of reference axis 212. If the block 232 inquiry is negative, the computer system implementing method 220 determines that no agglomeration occurs in the time step $t_i$ and cell of interest and method 220 proceeds to block 234. Block 234 is analogous to block 226 described above in the sense that block 234 involves maintaining the agglomerate diameter $d_a$ determined in the preceding time step and outputting that agglomerate diameter $d_a$ as the block 112 first $d_a$ output 114 (see FIG. 1). If the block 232 inquiry is positive, the computer system implementing method 220 determines that agglomeration occurs in time step $t_i$ and the cell of interest and method 220 proceeds to block 236. Block 236 is analogous to block 228 described above in the sense that block 236 comprises determining a new first agglomerate diameter $d_a$ for the time step $t_i$ and cell of interest and outputting that agglomerate diameter $d_a$ as the block 112 output 114 (see FIG. 1). The block 236 procedure for determining the first agglomerate diameter $d_a$ may involve solving a quadratic equation where the coefficients of the quadratic equation are based on the fact that the cell of interest has been assigned to class C of the FIG. 7 classification scheme. The block 236 procedure is described in more detail below.

Returning to block 230, if the block 230 inquiry is negative, then method 220 proceeds to block 240. Block 240 is analogous to blocks 222 and 230 described above in the sense that block 240 involves evaluating a condition based on at least some of the forces $\vec{F}_g$, $\vec{F}_d$ and $\vec{F}_{vw}$ (in the illustrated embodiment $\vec{F}_g$ and $\vec{F}_{vw}$). If the block 240 inquiry is positive, method 220 involves assigning the cell to case B of the FIG. 7 embodiment (where $\vec{F}_g$ is on the same side of reference axis 212 as $\vec{F}_{vw}$, but $\vec{F}_d$ is on the opposite side of reference axis 212 from $\vec{F}_{vw}$) and proceeding to block 242. Block 242 is analogous to blocks 224 and 232 described above in the sense that block 242 involves comparing the absolute value of the sum of the forces $\vec{F}_g$ and $\vec{F}_{vw}$, and the absolute value of the sum of the force $\vec{F}_c$ and $\vec{F}_d$ on opposing sides of reference axis 212. If the block 242 inquiry is negative, the computer system implementing method 220 determines that no agglomeration occurs in the time step $t_i$ and cell of interest and method 220 proceeds to block 244. Block 244 is analogous to blocks 226, 234 described above in the sense that block 244 involves maintaining the agglomerate diameter $d_a$ determined in the preceding time step and outputting that agglomerate diameter $d_a$ as the block 112 first $d_a$ output 114 (see FIG. 1). If the block 242 inquiry is positive, the computer system implementing method 220 determines that agglomeration occurs in time step $t_i$ and the cell of interest and method 220 proceeds to block 246. Block 246 is analogous to blocks 228, 236 described above in the sense that block 246 comprises determining a new first agglomerate diameter $d_a$ for the time step $t_i$ and cell of interest and outputting that agglomerate diameter $d_a$ as the block 112 output 114 (see FIG. 1). The block 246 procedure for determining the first agglomerate diameter $d_a$ may involve solving a quadratic equation where the coefficients of the quadratic equation are based on the fact that the cell of interest has been assigned to class B of the FIG. 7 classification scheme. The block 246 procedure is described in more detail below.

Returning to block 240, if the block 240 inquiry is negative, then method 220 involves assigning the cell to case D of the FIG. 7 embodiment (where $\vec{F}_g$ and $\vec{F}_d$ are both on the side of reference axis 212 opposite to $\vec{F}_{vw}$) and proceeding to block 250. Block 250 is analogous to blocks 224, 232 and 242 described above in the sense that block 250 involves comparing the absolute value of the force $\vec{F}_{vw}$ and the absolute value of the sum of the force $\vec{F}_g$, $\vec{F}_c$ and $\vec{F}_d$ on opposing sides of reference axis 212. If the block 250 inquiry is negative, the computer system implementing method 220 determines that no agglomeration occurs in the time step $t_i$ and cell of interest and method 220 proceeds to block 252. Block 252 is analogous to blocks 226, 234, 244 described above in the sense that block 252 involves maintaining the agglomerate diameter $d_a$ determined in the preceding time step and outputting that agglomerate diameter $d_a$ as the block 112 first $d_a$ output 114 (see FIG. 1). If the block 250 inquiry is positive, the computer system implementing method 220 determines that agglomeration occurs in the time step $t_i$ and cell of interest and method 220 proceeds to block 254. Block 254 is analogous to blocks 228, 236, 246 described above in the sense that block 254 comprises determining a new first agglomerate diameter $d_a$ for the time step $t_i$ and cell of interest and outputting that agglomerate diameter $d_a$ as the block 112 output 114 (see FIG. 1). The block 254 procedure for determining the first agglomerate diameter $d_a$ may involve solving a quadratic equation where the coefficients of the quadratic equation are based on the fact that the cell of interest has been assigned to class D of the FIG. 7 classification scheme. The block 254 procedure is described in more detail below.

Determining a New Agglomerate Diameter

As discussed above, under particular conditions, block 212 of method 100 comprises determining a new agglomerate diameter $d_a$ which is output from block 212 as a new first agglomerate diameter $d_a$ 114. In the particular case of the FIG. 8 embodiment (method 220), a new first agglomerate diameter $d_a$ is determined in blocks 228 (case A), 236 (case C), 246 (case B) and 254 (case D). In some embodiments, the procedure for determining the first diameter $d_a$ in any of these blocks may involve solving a quadratic equation of the form:

$$a_1 d_a^2 + a_2 d_a + a_3 = 0 \qquad (23)$$

where the coefficients $(a_1, a_2, a_3)$ of quadratic equation (23) are based on the classification case to which the cell is assigned. For example, in some embodiments, the coefficients $(a_1, a_2, a_3)$ may be determined in accordance with Table 2.

TABLE 2

Equations for coefficients four possible collision cases

| | Case A: $(F_d + F_g + F_{vw} = F_c)$ |
|---|---|
| $a_1$ | $+\dfrac{\pi}{6}(\rho_p - \rho_g)g - 0.052 \times \pi \rho_p \times \left(\dfrac{4 \cdot \sqrt{d_p} \cdot (E/(2 \cdot (1-\vartheta^2)))}{\pi \rho_p d_p^3}\right)^{0.4} \times (1+e) \times \left(\sqrt{3\theta}\right)^{1.2}$ |
| $a_2$ | $+0.125\pi \cdot C_d \cdot \rho_g \cdot \epsilon_g |V_g - V_s|^2 \, \epsilon_g^{-2.65}$ |
| $a_3$ | $+\dfrac{A}{24\delta^2}$ |
| | Case B: $(F_g + F_{vw} = F_c + F_d)$ |
| $a_1$ | $+\dfrac{\pi}{6}(\rho_p - \rho_g)g - 0.052 \times \pi \rho_p \times \left(\dfrac{4 \cdot \sqrt{d_p} \cdot (E/(2 \cdot (1-\vartheta^2)))}{\pi \rho_p d_p^3}\right)^{0.4} \times (1+e) \times \left(\sqrt{3\theta}\right)^{1.2}$ |
| $a_2$ | $-0.125\pi \cdot C_d \cdot (1-\epsilon_g)\rho_g \cdot \epsilon_g |V_g - V_s|^2 \, \epsilon_g^{-2.65}$ |

TABLE 2-continued

Equations for coefficients four possible collision cases

| | |
|---|---|
| $a_3$ | $+\dfrac{A}{24\delta^2}$ |

Case C: $(F_d + F_{vw} = F_c + F_g)$

| | |
|---|---|
| $a_1$ | $-\dfrac{\pi}{6}(\rho_p - \rho_g)g - 0.052 \times \pi \rho_p d_p^3 \times \left(\dfrac{4 \cdot \sqrt{d_p} \cdot (E/(2 \cdot (1-\vartheta^2)))}{\pi \rho_p d_p^3}\right)^{0.4} \times (1+e) \times \left(\sqrt{3\theta}\right)^{1.2}$ |
| $a_2$ | $+0.125\pi \cdot C_d \cdot \rho_g \cdot \epsilon_g |V_g - V_s|^2 \, \epsilon_g^{-2.65}$ |
| $a_3$ | $+\dfrac{A}{24\delta^2}$ |

Case D: $(F_d + F_g + F_c = F_{vw})$

| | |
|---|---|
| $a_1$ | $-\dfrac{\pi}{6}(\rho_p - \rho_g)g - 0.052 \times \pi \rho_p \times \left(\dfrac{4 \cdot \sqrt{d_p} \cdot (E/(2 \cdot (1-\vartheta^2)))}{\pi \rho_p d_p^3}\right)^{0.4} \times (1+e) \times \left(\sqrt{3\theta}\right)^{1.2}$ |
| $a_2$ | $-0.125\pi \cdot C_d \cdot \rho_g \cdot \epsilon_g |V_g - V_s|^2 \, \epsilon_g^{-2.65}$ |
| $a_3$ | $+\dfrac{A}{24\delta^2}$ |

Once the coefficients ($a_1$, $a_2$, $a_3$) are determined then equation (23) may be solved for $d_a$ to obtain the first $d_a$ 114 output from block 112. In this approach, the Reynolds number and other terms which depend on the agglomerate diameter $d_a$ may be treated explicitly in each time step $t_i$ based on the most recently determined agglomerate diameter $d_a$ (which may be determined in a preceding time step, as discussed in more detail below). At the beginning of simulations, the original (non-agglomerated) particle diameter $d_p$ is taken as an initial value of the agglomerate diameter $d_a$, as discussed above, and the agglomerate diameter is then updated as described herein. In some embodiments, particle deformation may be ignored during agglomerate formation and the mass of formed agglomerate may be taken to be the same as the total mass of the colliding particles. To obtain a reasonable estimate of the space filled by the agglomerate for the purpose of drag determination and/or modification, the agglomerates may be assumed, in some embodiments, to take the shape of a sphere in 3D simulations or a circular cylinder in 2D simulations.

Returning to method 100 (FIG. 1), once the first agglomerate diameter $d_a$ is determined in block 112 for the time step $t_i$ and cell of interest, then method 100 proceeds to block 116. Block 116 may involve determining the number of primary particles N that fit into the agglomerate shape. In some embodiments, the block 116 determination may involve:

a) for a two-dimensional system, evaluating:

$$A_{agg\_new} = N_1 \cdot A_{agg\_old} \rightarrow N_1 = \text{roundup}\left[\left(\dfrac{d_{agg\_new}}{d_{agg\_old}}\right)^2\right] \quad (24)$$

$$A_{agg\_old} = N_2 \cdot A_p \rightarrow N_2 = \text{roundup}\left[\left(\dfrac{d_{agg\_old}}{d_p}\right)^2\right] \quad (25)$$

$$N = N_1 \cdot N_2 \quad (26)$$

where $A_{agg\_new}$ and $A_{agg\_old}$ are the surface areas of the new agglomerates and the agglomerate at the previous time step, $d_r$ is the particle diameter, $d_{agg\_old}$ is the agglomerate diameter $d_a$ at the conclusion of the previous time step and $d_{agg\_new}$ is the first agglomerate diameter $d_a$ 114 in the current time step determined in the force balancing block 112. $N_1$ is the number of old agglomerates (determined in the previous time step) that fit inside the newly determined agglomerate shape, and $N_2$ is the number of particles in the agglomerate determined in the previous time step. In accordance with equations (24) and (25), $N_1$ and $N_2$ are rounded up to the next integer multiple. In some embodiments, the collision in each cell is assumed to take place between identical particles and, if there is an existing agglomerate inside the cell, the collision is assumed to take place between two identical agglomerates. In the case of an agglomerate-agglomerate collision, the number of particles in each pre-existing agglomerate involved in a collision may be determined using equation (25) and the number of pre-existing agglomerates inside the new agglomerate may be determined using equation (24). The total number of primary particles inside the new agglomerate (N) may then be determined using equation (26). The inverse of the number of primary particles in the new agglomerate (1/N) may account for a loose agglomerate size and may be used as a basis for modifying the drag relationship(s) used by a commercially available CFD solver to determine the output 104 of method 100 for the current time step $t_i$. In some embodiments, the inverse of the number of primary particles in the new agglomerate (1/N) may be applied as a correction factor to update or otherwise modify one or more drag terms $T_{drag}$ at the current time step $t_i$ in conservation of momentum relationship(s) for the gas and/or solid phase of a commercially available CFD solver. The CFD solver may then determine the output 104 of method 100 for the current time step $t_i$ based on the conservation of momentum relationship(s) having the one or more modified drag terms $T_{drag}$, as described in more detail below.

a) for a three-dimensional system, evaluating:

$$V_{agg\_new} = N_1 \cdot V_{agg\_old} \rightarrow N_1 = \text{roundup}\left[\left(\frac{d_{agg\_new}}{d_{agg\_old}}\right)^3\right] \quad (27)$$

$$V_{agg\_old} = N_2 \cdot V_p \rightarrow N_2 = \text{roundup}\left[\left(\frac{d_{agg\_old}}{d_p}\right)^3\right] \quad (28)$$

$$N = N_1 \cdot N_2 \quad (29)$$

where $V_{agg\_new}$ and $V_{agg\_old}$ are the volumes of the new agglomerates and of the agglomerates from the previous time step.

Based on this determination of N (i.e. the number of primary particles that fit into the agglomerate shape), block 116 may comprise determining a "refined" agglomerate diameter $d_a$ which may be output from block 116 as refined agglomerate diameter $d_a$ 118. In some embodiments, the block 116 determination of the refined agglomerate diameter $d_a$ 118 may involve evaluating:

$$\text{For 2D system: } d_a = \sqrt{N} \cdot d_p \quad (30)$$

$$\text{For 3D system: } d_a = \sqrt[3]{N} \cdot d_p \quad (31)$$

Method 100 then proceeds to block 120 where the refined agglomerate diameter $d_a$ 118 is evaluated to ensure a physically reasonable value by imposing a condition that the agglomerate volume $V_{agg\_new}$ must not exceed the volume of solid in the cell of interest. If the block 120 evaluation is negative (i.e. the refined agglomerate diameter $d_a$ 118 is not allowable), then method 100 proceeds to block 122 where the refined agglomerate diameter $d_a$ 118 is set to be a refined allowable agglomerate diameter $d_a$ which may be output from block 122 as refined allowable agglomerate diameter $d_a$ 124. In some embodiments, block 122 comprises setting agglomerate volume $V_{agg\_new}$ to be equal to the volume of the solid phase in the cell of interest and then determining the refined allowable agglomerate diameter $d_a$ 124 corresponding to this agglomerate volume $V_{agg\_new}$. Block 122 may also involve updating the terms N, $N_1$ and $N_2$ (as defined above in connection with equations (24)-(26) or equations (27)-(29)) based on setting agglomerate volume $V_{agg\_new}$ to be equal to the volume of the solid phase in the cell of interest. The procedures of block 120 and 122 ensure that continuity of the solid phase is taken into consideration in the model.

After block 120, method 100 proceeds to block 126, either via the block 120 YES branch or via the block 120 NO branch and block 122. In either case, method 100 has determined an allowable refined value for the agglomerate diameter $d_a$ and a corresponding value for the number N of primary particles that fit into the agglomerate shape for the current time step $t_i$ and the cell of interest. As discussed above, the number N of primary particles that fit into the agglomerate shape for the current time step $t_i$ and the cell of interest may be determined on the basis of the agglomerate diameter $d_a$ for the current time step $t_i$ and the cell of interest determined in one of blocks 112, 116. It will be appreciated that there may be a direct relationship between the parameters $d_a$ and N, based on the assumed shape of the agglomerate, which is assumed to be spherical in some embodiments. In block 126, the number N of primary particles that fit into the agglomerate shape for the current time step $t_i$ and the cell of interest may be used as a basis for updating or otherwise modifying the drag relationship(s) used by a commercially available CFD solver to determine the output 104 of method 100 for the current time step $t_i$. In practice, the block 126 procedure may be implemented by the CFD solver itself. A variety of CFD solvers are known to those skilled in the art. One non-limiting example of a commercially available CFD solver is the ANSYS Fluent CFD solver sold by ANSYS, Inc. of Canonsburg, Pa. In some embodiments, the inverse of the number of primary particles in the new agglomerate (1/N) may be applied (in block 126) as a correction factor to update or otherwise modify one or more drag terms $T_{drag}$ at the current time step $t_i$ in conservation of momentum relationship(s) for the gas and/or solid phase of the CFD solver. CFD solvers typically use a drag coefficient β in the conservation of momentum equations governing the gas and solid phases. CFD solvers typically determine such drag coefficients β using conventional drag correlations, a non-limiting example of which are the conventional Wen-Yu drag correlations described in Wen, C. Y., Yu, Y. H. (1966), Mechanics of Fluidization. Chemical Engineering Progress Symposium Series, 62, 100-111 (which is hereby incorporated herein by reference). The conventional Wen-Yu drag correlations are based on projected area of a single particle. When agglomerates form, the drag term is decreased. In some embodiments, the projected area of the new agglomerate may be assumed to be linearly related to the number of primary particles N, such that a corrective factor (1/N) may be applied to the drag coefficient β to thereby obtain one or more updated drag term(s) $T_{drag}$ for the current time step $t_i$ 128 for use in the conservation of momentum relationship(s) for the gas and/or solid phase of the CFD solver. In some embodiments, the number N of primary particles that fit into the agglomerate shape and/or the agglomerate diameter $d_a$ for the current time step $t_i$ and the cell of interest may be used as a basis for otherwise updating or modifying or the drag relationship(s) used by the CFD solver to determine the output 104 of method 100 for the current time step $t_i$.

Once the one or more drag terms $T_{drag}$ for the current time step $t_i$ 128 are determined in block 126 or the drag relationship(s) used by the CFD solver are otherwise updated or modified for the current time step $t_i$, method 100 proceeds to block 130. Block 130 involves using the one or more modified/updated drag terms $T_{drag}$ and/or drag relationship(s) for the current time step $t_i$ 128 in a conventional CFD solver to determine model predictions 104. Model predictions 104 are described above. The CFD solver used in block 130 may comprise any suitable CFD solver known in the art. By way of non-limiting example, the CFD solver used in block 130 may be the ANSYS Fluent CFD solver sold by ANSYS, Inc. of Canonsburg, Pa. In some embodiments, CFD solvers solve a set of equations implicitly for all cells of interest for each time step. In some embodiments, CFD solvers solve a set of differential equations using a finite volume technique, which is described, for example, in the ANSYS Fluent manual, (ANSYS Inc. (2011), FLUENT 13.0 Theory Documentation. Canonsburg, Pa.), which is hereby incorporated herein by reference.

One non-limiting example embodiment of how blocks 126 and 130 may be implemented is described in CFD SIMULATION OF TWO- AND THREE-PHASE FLOW IN FCC REACTORS, A. H. Ahmadi Motlagh, PhD Dissertation, March 2015, which is hereby incorporated herein by reference.

After performing the CFD solve in block 130, method 100 proceeds to block 132 which involves evaluating a loop exit condition. The block 132 loop exit condition may generally comprise any condition, such as, by way of non-limiting example, a temporal condition over which a simulation is run, a number of time steps over which a simulation is run, and/or the like. If the block 132 loop exit condition is positive (block 132 YES branch), then method 100 ends. Otherwise, method 100 proceeds to block 134.

Block 134 involves approximating how agglomerates move inside the fluidized bed being modelled. As discussed above, a single agglomerate diameter $d_a$ is associated with each Eulerian cell. In some embodiments, changes in agglomerate diameter $d_a$ are traced as agglomerates move from cell to neighboring cells by estimating the solid mass flux into the cell of interest in block 134 and then this solid mass flux is then used to approximate a new agglomerate diameter $d_a$ in the cell of interest at the start of the next time step $t_{i+1}$. In block 134, the solid mass flux into the cell of interest from neighboring cells may be determined using the CFD output 104 and this solid mass flux together with the current agglomerate diameters $d_a$ of these neighboring cells may be used to estimate an agglomerate diameter $d_a$ in the cell of interest at the start of the next time step $t_{i+1}$ which is shown in FIG. 1 as block 134 output 136.

Figure 9:
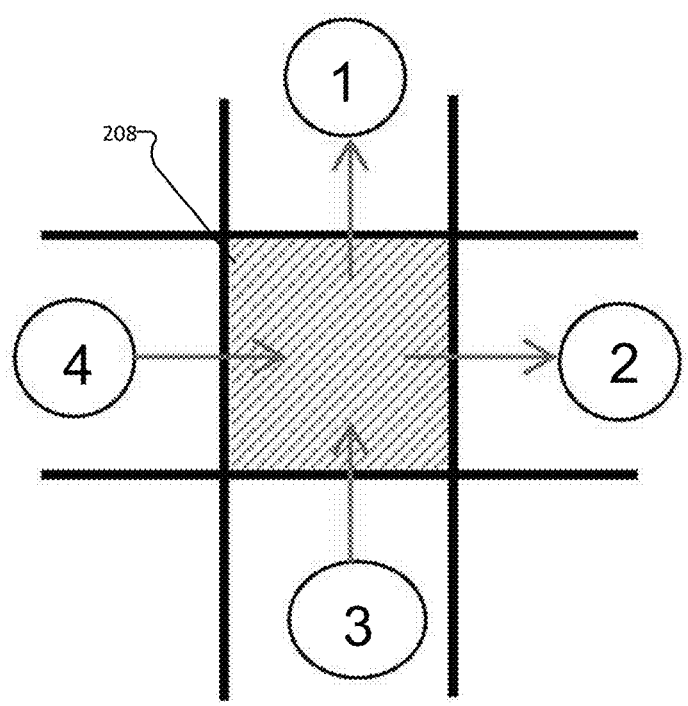
FIG. 9 is a schematic depiction of solid fluxes into an Eulerian cell from neighboring Eulerian cells which may be used to determine a new agglomerate diameter at the outset of a next time step in the FIG. 1 method according to a particular embodiment.

A schematic example of this block 134 procedure for estimating agglomerate diameter $d_a$ at the start of the next time step $t_{i+1}$ 136 is illustrated in FIG. 9. Based on the direction of solid fluxes shown in FIG. 9, neighboring cells 3 and 4 have flux into cell 208 of interest. The inward fluxes from neighboring cells 3 and 4, together with the current time step agglomerate diameters $d_a$ in neighboring cells 3 and 4 may be used to estimate agglomerate diameter $d_a$ at the start of the next time step $t_{i+1}$ 136 for the cell of interest 208. The value and direction of solid mass fluxes from neighboring cells 3 and 4 into cell of interest 208 may be extracted from the CFD solver output 104. This block 134 approach takes into account the direction of the solid mass flux and consider neighboring cells having solid mass flux entering cell of interest 208 (e.g. neighboring cells 3 and 4 in the FIG. 9 example). The solid mass flux exiting cell of interest 208 may be considered as incoming flux in the corresponding block 134 procedure for other cells. In some embodiments, it may be assumed that each cell has equal face areas and that the density of the solid does not change. Based on this assumption, for the example shown in FIG. 9, the agglomerate diameter $d_a$ at the start of the next time step $t_{i+1}$ 136 for the cell of interest 208 may be determined in accordance with:

$$d_{a,new} = \frac{\varepsilon_{s3} V_{s3} d_{a3} + \varepsilon_{s4} V_{s4} d_{a4}}{\varepsilon_{s3} V_{s3} + \varepsilon_{s4} V_{s4}} \quad (32)$$

where $d_{a,new}$ is the estimated agglomerate diameter $d_a$ at the start of the next time step $t_{i+1}$ 136 for the cell of interest 208, $\varepsilon_{s3}$ and $\varepsilon_{s4}$ are the solid volume fractions in neighboring cells 3 and 4, $d_{a3}$ and $d_{a4}$ are the corresponding agglomerate diameters in neighboring cells 3 and 4, and $V_{s3}$, $V_{s4}$ are solid velocities in neighboring cells 3 and 4 (which may be part of CFD output 104). The solid fluxes from neighboring cells 1 and 2 are not included in equation (32), since the solid flux is directed from cell of interest 208 into neighboring cells 1 and 2. If the face areas of cells shown in FIG. 9 are not equal, equation (32) may be modified by multiplying each term by the face area of its corresponding cell. It will be appreciated by those skilled in the art that the procedure of block 134 can be extended to three-dimensional systems and any type of computational grid using the same concept. The estimated agglomerate diameter $d_a$ at the start of the next time step $t_{i+1}$ 136 may then be used in force-balance block 112 for the next time step $t_{i+1}$.

At the conclusion of block 134, method 100 proceeds to block 136 where the time step $t_i$ is incremented to $t_{i+1}$ and method 100 then loops back to block 110, for another iteration, corresponding to the new time step.

Referring back to optional block 110 (FIG. 1) discussed above, if it is determined in block 110 that the cell of interest in method 100 is a boundary cell (i.e. adjacent to a wall of the structure in which the fluidized bed is located), then method 100 proceeds (via the block 110 YES branch) to optional block 140. In cells adjacent to walls of the structure in which the fluidized bed is located, particle-wall collisions occur, as well as particle-particle collisions, but in a different manner. The collisions between moving particles and a stationary wall may behave differently than particle-particle collisions and may have cohesive forces greater than, or less than, those of particle-particle collisions. The mechanism of agglomerate formation near the walls therefore differs from that for particle-particle agglomerate formation described above. Although the effect of walls on hydrodynamics of lab-scale fluidized beds might be significant, the contribution of wall-based effects to the overall hydrodynamics of the fluidized bed decreases as the size of the fluidized bed increases. In some embodiments, boundary cells may be treated differently by setting the term N=1 in block 140. With N=1, no agglomeration is formed in boundary cells and consequently, $d_a=d_p$ and $T_{drag}$ is constant as shown in FIG. 1 as output 142 of block 140. Method 100 then proceeds to block 144 (which is analogous to block 130 described above) and to block 148 (which is analogous to block 132 described above) before returning to block 138 to iterate the time step and loop back for another iteration.

Figure 10:
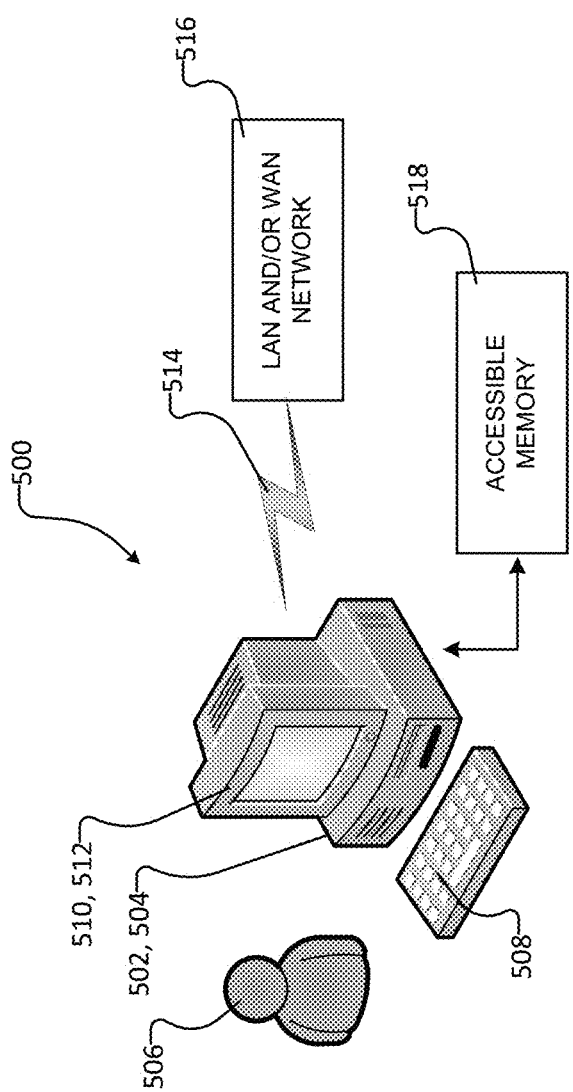
FIG. 10 is a schematic depiction of a system which may be used to perform any of the methods described herein according to a particular embodiment.

FIG. 10 is a schematic depiction of a system 500 which may be used to perform any of the methods described herein and the steps of any of the methods described herein according to a particular embodiment. System 500 of the illustrated embodiment comprises one or more computers 502 which may comprise one or more processors 504 which may in turn execute suitable software (not expressly enumerated) accessible to processor(s) 504. When such software is executed by computer 502 (and in particular processor(s) 504), computer 502 and/or processor(s) 504 may perform any of the methods described herein and the steps of any of the methods described herein. In the illustrated embodiment, computer 502 provides a user interface 510 for interaction with a user 506. From a hardware perspective, user interface 510 comprises one or more input devices 508 by which user 506 can input information to computer 502 and one or more output devices 512 by which information can be output to user 506. In general, input devices 508 and output devices 512 are not limited to those shown in the illustrated embodiment of FIG. 10. In general, input device 508 and output device 512 may comprise any suitable input and/or output devices suitable for interacting with computer 502. User interface 510 may also be provided in part by software when such software is executed by computer 502 and/or its processor(s) 504. In the illustrated embodiment, computer 502 is also connected to access data (and/or to store data) on accessible memory device 518. In the illustrated embodiment, computer 502 is also connected by communication interface 514 to a LAN and/or WAN network 516, to enable accessing data from networked devices (not shown) and/or communication of data to networked devices.

Input may be obtained by computer 502 via any of its input mechanisms, including, without limitation, by any input device 508, from accessible memory 518, from network 516 or by any other suitable input mechanism. The outputs may be output from computer 502 via any of its output mechanisms, including, without limitation, by any output device 512, to accessible memory 518, to network 516 or to any other suitable output mechanism. As discussed above, FIG. 10 is merely a schematic depiction of a particular embodiment of a computer-based system 500 suitable for implementing the methods described herein. Suitable systems are not limited to the particular type shown in the schematic depiction of FIG. 10 and suitable components (e.g. input and output devices) are not limited to those shown in the schematic depiction of FIG. 10.

The methods described herein may be implemented by computers comprising one or more processors and/or by one or more suitable processors, which may, in some embodiments, comprise components of suitable computer systems. By way of non-limiting example, such processors could comprise part of a computer-based automated contract valuation system. In general, such processors may comprise any suitable processor, such as, for example, a suitably configured computer, microprocessor, microcontroller, digital signal processor, field-programmable gate array (FPGA), other type of programmable logic device, pluralities of the foregoing, combinations of the foregoing, and/or the like. Such a processor may have access to software which may be stored in computer-readable memory accessible to the processor and/or in computer-readable memory that is integral to the processor. The processor may be configured to read and execute such software instructions and, when executed by the processor, such software may cause the processor to implement some of the functionalities described herein.

Certain implementations of the invention comprise computer processors which execute software instructions which cause the processors to perform a method of the invention. For example, one or more processors in a computer system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- The embodiments set out above comprise a particular relationship for determining the drag force $\vec{F}_d$. This particular relationship is not a requirement. In other embodiments, other relationships, models, theories equations and/or the like may be used to determine the drag force $\vec{F}_d$. In some embodiments, such relationships for determining the drag force $\vec{F}_d$ may be based at least in part on the agglomerate diameter $d_a$ determined at the conclusion of a preceding time step, although this is not necessary. In some embodiments, such agglomerate diameter $d_a$ determined at the conclusion of a previous time step may be based at least in part on a solid mass flux associated with one or more neighboring cells in the preceding time step, the one or more neighboring cells sharing a boundary with the cell. A non-limiting example of such a solid mass flux analysis is described above in connection with block 134 of method 100 (FIG. 1).
- The embodiments described above describe the use of the agglomerate diameter $d_a$ for the current time step $t_i$, and/or the corresponding number N of primary particles that fit into an agglomerate shape having the agglomerate diameter $d_a$, to modify one or more drag terms in conservation of momentum relationship(s) for the gas phase and/or the solid phase. Such conservation of momentum relationship(s) are then used by a CFD solver to determine the output 104 of method 100 (e.g. any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell) at the current time step $t_i$. Different CFD solvers may have different conservation momentum relationship(s) and/or corresponding different drag term(s). In some embodiments, the agglomerate diameter $d_a$ for the current time step $t_i$, and/or the corresponding number N of primary particles that fit into an agglomerate shape having the agglomerate diameter $d_a$, may be used to modify the drag term(s) or otherwise modify the drag model(s) used in such different CFD solvers.
- The embodiments described above assume that agglomerates and particles have generally spherical shapes which can be parameterized by the agglomerate diameter $d_a$ and the particle diameter $d_p$, respectively. This is not necessary. In some embodiments, agglomerates and/or particles may be assumed to have different shapes which may be parameterized by one or more additional or alternative parameters.
- The embodiments described above take into account asperities when determining the van der Waals force $\vec{F}_{vw}$. In the embodiment described above, asperities are assumed to have hemispherical shapes parameterized by the asperity diameter $d_{as}$. This is not necessary. In some embodiments, asperities may be assumed to have different shapes which may be parameterized by one or more additional or alternative parameters.

While a number of exemplary aspects and embodiments have been discussed above, those of skill in the art will recognize certain modifications, permutations, additions and sub-combinations thereof. It is therefore intended that the following appended aspects or claims and aspects or claims hereafter introduced are interpreted to include all such modifications, permutations, additions and sub-combinations.

What is claimed is:

1. A method, performed by a computer, for simulating behavior of a gas-solid mixture in a fluidized bed having a particulate comprising Geldart group A particles, the method comprising:
   discretizing the fluidized bed into a plurality of Eulerian cells and simulating, by the computer, the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
   wherein simulating, by the computer, the behavior of the gas-solid mixture over the series of time steps comprises, for each time step and for each cell:
      obtaining, by the computer, an initial value of an agglomerate diameter corresponding to the cell and corresponding to the beginning of the time step;
      performing, by the computer, a force-balance procedure for the cell to determine a first agglomerate diameter corresponding to the cell and corresponding to the time step, wherein performing the force-balance procedure comprises determining a plurality of forces for the cell based at least in part on the initial value of the agglomerate diameter;
      updating, by the computer, one or more drag relationships for the time step based at least in part on the first agglomerate diameter; and
      performing, by the computer, a computational fluid dynamic (CFD) solve procedure to determine, for the time step, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
      wherein performing, by the computer, the CFD solve procedure is based at least in part on the updated drag relationships; and
   wherein, for each time step and for each cell, performing, by the computer, the force-balance procedure to determine the first agglomerate diameter comprises:
      assigning the cell to be in a particular one of a finite plurality of classification cases based on the directions of the at least some of the determined plurality of forces; and
      determining the first agglomerate diameter based at least in part on the particular one of the finite plurality of classification cases to which the cell is assigned.

2. A method according to claim 1, wherein, for each time step and for each cell:
   updating, by the computer, the one or more drag relationships for the time step comprises updating, by the computer, one or more drag terms in at least one of a conservation of momentum relationship for the gas and a conservation of momentum relationship for the solid for the time step based at least in part on the first agglomerate diameter; and
   performing, by the computer, the CFD solve procedure is based at least in part on the at least one of the conservation of momentum relationships for the gas and the solid having the one or more updated drag terms.

3. A method according to claim 1 wherein, for each time step and for each cell, updating, by the computer, the one or more drag relationships for the time step based at least in part on the first agglomerate diameter comprises:
   determining, by the computer, a number N of primary particles that fit into an assumed agglomerate shape for the time step based on the first agglomerate diameter; and
   updating, by the computer, the one or more drag relationships for the time step based at least in part on the number N of primary particles that fit into the assumed agglomerate shape for the time step.

4. A method according to claim 1 wherein, for each time step and for each cell, performing, by the computer, the force-balance procedure to determine the first agglomerate diameter is based at least in part on the magnitudes and directions of at least some of the determined plurality of forces.

5. A method according to claim 1 wherein, for each time step and for each cell, the determined plurality of forces comprises one or more of: a van der Waals force, a collision force, a gravitational force and a drag force.

6. A method according to claim 5 wherein, for each time step and for each cell, assigning the cell to be in the particular one of the finite plurality of classification cases based on the directions of the at least some of the determined plurality of forces comprises:
   determining a notional axis based on opposing directions of the van der Waals force and the collision force;
   determining a reference axis or plane that is orthogonal to the notional axis; and
   assigning the cell to be in the particular one of the finite plurality of classification cases based at least in part on the directions of the at least some of the determined plurality of forces relative to the reference axis or plane.

7. A method according to claim 6 wherein, for each time step and for each cell, assigning the cell to be in the particular one of the finite plurality of classification cases based at least in part on the directions of the at least some of the determined plurality of forces relative to the reference axis or plane comprises:
   assigning the cell to be in a first case (case A) where the gravitational force and the drag force are oriented to extend away from the reference axis or plane on the same side of the reference axis or plane as the van der Waals force;
   assigning the cell to be in a second case (case B) where the gravitational force is oriented to extend away from the reference axis or plane on the same side of the reference axis or plane as the van der Waals force and the drag force is oriented to extend away from the reference axis or plane on an opposing side of the reference axis or plane from the van der Waals force;
   assigning the cell to be in a third case (case C) where the drag force is oriented to extend away from the reference axis or plane on the same side of the reference axis or plane as the van der Waals force and the gravitational force is oriented to extend away from the reference axis or plane on the opposing side of the reference axis or plane from the van der Waals force; and
   assigning the cell to be in a fourth case (case D) where the gravitational force and the drag force are oriented to extend away from the reference axis or plane on the opposing side of the reference axis or plane from the van der Waals force.

8. A method according to claim 7 wherein, for each time step and for each cell, determining the first agglomerate diameter based at least in part on the particular one of the finite plurality of classification cases to which the cell is assigned comprises:
if an absolute value a sum of the at least some of the determined plurality of forces oriented to extend away from the reference axis or plane on the same side of the reference axis or plane as the van der Waals force is greater than an absolute value of a sum of the at least some of the determined plurality of forces oriented to extend away from the reference axis or plane on the opposing side of the reference axis or plane from the van der Waals force, then determining a new first agglomerate diameter for the time step; and
otherwise, determining the first agglomerate diameter for the time step to be the same as the initial value of the agglomerate diameter corresponding to the beginning of the time step.

9. A method according to claim 7 wherein, for each time step and for each cell, determining the first agglomerate diameter based at least in part on the particular one of the finite plurality of classification cases to which the cell is assigned comprises solving an equation, wherein the equation depends on the particular one of the finite plurality of classification cases to which the cell is assigned.

10. A method according to claim 7 wherein, for each time step and for each cell, determining the first agglomerate diameter based at least in part on the particular one of the finite plurality of classification cases to which the cell is assigned comprises solving a quadratic equation, wherein the coefficients of the quadratic equation depend on the particular one of the finite plurality of classification cases to which the cell is assigned.

11. A method, performed by a computer, for simulating behavior of a gas-solid mixture in a fluidized bed having a particulate comprising Geldart group A particles, the method comprising:
discretizing the fluidized bed into a plurality of Eulerian cells and simulating, by the computer, the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
wherein simulating, by the computer, the behavior of the gas-solid mixture over the series of time steps comprises, for each time step and for each cell:
obtaining, by the computer, an initial value of an agglomerate diameter corresponding to the cell and corresponding to the beginning of the time step;
performing, by the computer, a force-balance procedure for the cell to determine a first agglomerate diameter corresponding to the cell and corresponding to the time step, wherein performing the force-balance procedure comprises determining a plurality of forces for the cell based at least in part on the initial value of the agglomerate diameter;
updating, by the computer, one or more drag relationships for the time step based at least in part on the first agglomerate diameter; and
performing, by the computer, a computational fluid dynamic (CFD) solve procedure to determine, for the time step, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
wherein performing, by the computer, the CFD solve procedure is based at least in part on the updated drag relationships; and
for each time step and for each cell, prior to updating, by the computer, one or more drag relationships for the time step based at least in part on the first agglomerate diameter:
determining an integer number N of primary particles that fit into an assumed agglomerate shape for the time step and the cell, the integer number N of primary particles dependent on the first agglomerate diameter; and
refining the first agglomerate diameter based at least in part on the integer number N of primary particles.

12. A method according to claim 11 wherein, for each time step and for each cell:
determining the integer number N of primary particles based on the first agglomerate diameter comprises application of either, for a 2-dimensional system, $$N = \left(\text{roundup}\left[\left(\frac{d_{agg\_new}}{d_{agg\_old}}\right)^2\right]\right) \cdot \left(\text{roundup}\left[\left(\frac{d_{agg\_old}}{d_p}\right)^2\right]\right)$$

or, for a 3-dimensional system, $$N = \left(\text{roundup}\left[\left(\frac{d_{agg\_new}}{d_{agg\_old}}\right)^3\right]\right) \cdot \left(\text{roundup}\left[\left(\frac{d_{agg\_old}}{d_p}\right)^3\right]\right)$$

where $d_{agg\_old}$ is the initial value of the agglomerate diameter, $d_p$ is a diameter of the particle and $d_{agg\_new}$ is the first agglomerate diameter; and
refining the first agglomerate diameter based at least in part on the integer number N of primary particles comprises application of either, for the 2-dimensional system, $$d_a = \sqrt{N} \cdot d_p$$

or, for the 3-dimensional system, $$d_a = \sqrt[3]{N} \cdot d_p.$$

13. A method according to claim 11 comprising, for each time step and for each cell, prior to updating, by the computer, one or more drag relationships for the time step based at least in part on the first agglomerate diameter:
verifying, by the computer, that the first agglomerate diameter is allowable by checking that an agglomerate volume determined on the basis of the first agglomerate diameter is less than or equal to a volume of solid in the cell; and
if the agglomerate volume is greater than or equal to a volume of solid in the cell, setting an allowable agglomerate volume to be equal to the volume of the solid in the cell and adjusting the integer number N of primary particles and the first agglomerate diameter based on the allowable agglomerate volume.

14. A method, performed by a computer, for simulating behavior of a gas-solid mixture in a fluidized bed having a particulate comprising Geldart group A particles, the method comprising:
discretizing the fluidized bed into a plurality of Eulerian cells and simulating, by the computer, the behavior of the gas-solid mixture over a series of discrete time steps to determine, for each time step and for each cell any one or more of: a gas velocity $\vec{V}_g$ for the cell, a particle velocity $\vec{V}_g$, for the cell, a gas pressure for the cell, a particulate pressure for the cell and a solid fraction $\varepsilon_s$ for the cell;
wherein simulating, by the computer, the behavior of the gas-solid mixture over the series of time steps comprises, for each time step and for each cell:
obtaining, by the computer, an initial value of an agglomerate diameter corresponding to the cell and corresponding to the beginning of the time step;
performing, by the computer, a force-balance procedure for the cell to determine a first agglomerate diameter corresponding to the cell and corresponding to the time step, wherein performing the force-balance procedure comprises determining a plurality of forces for the cell based at least in part on the initial value of the agglomerate diameter;
updating, by the computer, one or more drag relationships for the time step based at least in part on the first agglomerate diameter; and
performing, by the computer, a computational fluid dynamic (CFD) solve procedure to determine, for the time step, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
wherein performing, by the computer, the CFD solve procedure is based at least in part on the updated drag relationships; and
wherein, for each time step and for each cell, obtaining, by the computer, the initial value of the agglomerate diameter corresponding to the cell and corresponding to the beginning of the time step comprises determining the initial value of the agglomerate diameter based at least in part on a solid mass flux associated with one or more neighboring cells in a preceding time step, the one or more neighboring cells sharing a boundary with the cell.

15. A method according to claim 14 wherein, for each time step and for each cell, obtaining, by the computer, the initial value of the agglomerate diameter corresponding to the cell and corresponding to the beginning of the time step comprises determining the initial value of the agglomerate diameter based at least in part on the first agglomerate diameters corresponding to the neighboring cells and corresponding to the preceding time step.

16. A method according to claim 14 wherein, for each time step and for each cell, determining the initial value of the agglomerate diameter based at least in part on a solid mass flux associated with one or more neighboring cells in the preceding time step comprises determining the initial value of the agglomerate diameter based on a subset of the neighboring cells which have solid mass flux in the preceding time step that is oriented into the cell and excluding the neighboring cells which have solid mass flux in the preceding time step that is oriented from the cell into the neighboring cells.

17. A method according to claim 16 wherein, for each time step and for each cell, obtaining, by the computer, the initial value of the agglomerate diameter corresponding to the cell and corresponding to the beginning of the time step comprises determining the initial value of the agglomerate diameter based at least in part on the first agglomerate diameters corresponding to the subset of the neighboring cells and corresponding to the preceding time step.

18. A method according to claim 1 wherein, for each time step and for each cell, determining the plurality of forces for the cell comprises determining an estimate of a van der Waals force for the cell and wherein determining the estimate of the van der Waals force for the cell is based at least in part on a model for asperities present on surfaces of particles in the cell.

19. A method according to claim 18 wherein the model for asperities present on the surfaces of particles in the cell is based on a size parameter for the asperities and a surface-area-coverage (SAC) parameter for the asperities on the surface of the particles in the cell.

20. A method according to claim 18 wherein the model for asperities present on the surfaces of particles in the cell comprises a sum of a plurality of force terms, wherein the plurality of force terms comprise a force term representing particle-particle van der Waals forces, a force term representing particle-asperity van der Waals forces and a force term representing asperity-asperity van der Waals forces.

21. A method according to claim 18 wherein the model for asperities present on the surfaces of particles in the cell comprises an assumption that the asperities have hemispherical shapes or other shapes parameterized by an asperity diameter $d_{as}$.

22. A non-transitory computer-readable medium comprising computer executable code that, when executed by a computer system comprising one computer or a plurality of computers operatively connected using a data communications network, causes the computer system to perform the method of claim 1.

23. A system for simulating behavior of a gas-solid mixture in a fluidized bed having a particulate comprising Geldart group A particles, the system comprising one or more processors configured to:
discretize the fluidized bed into a plurality of Eulerian cells and simulate the behavior of the gas-solid mixture over a series of discrete time steps to determine, for each time step and for each cell any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;
wherein the one or more processors are configured to simulate the behavior of the gas-solid mixture over the series of time steps by, for each time step and for each cell:
obtaining, by the computer, an initial value of an agglomerate diameter corresponding to the cell and corresponding to the beginning of the time step;
performing, by the computer, a force-balance procedure for the cell to determine a first agglomerate diameter corresponding to the cell and corresponding to the time step, wherein performing the force-balance procedure comprises determining a plurality of forces for the cell based at least in part on the initial value of the agglomerate diameter;

updating, by the computer, one or more drag relationships for the time step based at least in part on the first agglomerate diameter; and performing, by the computer, a computational fluid dynamic (CFD) solve procedure to determine, for the time, the any one or more of: a gas velocity $\vec{V}_g$ for the cell, a particle velocity $\vec{V}_s$ for the cell, a gas pressure for the cell, a particulate pressure for the cell and a solid fraction $\varepsilon_s$ for the cell;

wherein performing, by the computer, the CFD solve procedure is based at least in part on the updated drag relationships;

wherein performing, by the computer, the force-balance procedure to determine the first agglomerate diameter comprises:

assigning the cell to be in a particular one of a finite plurality of classification cases based on the directions of the at least some of the determined plurality of forces; and determining the first agglomerate diameter based at least in part on the particular one of the finite plurality of classification cases to which the cell is assigned.

\* \* \* \* \*

UNITED STATES PATENT AND TRADEMARK OFFICE
CERTIFICATE OF CORRECTION

| | |
|---|---|
| PATENT NO. | : 10,423,736 B2 |
| APPLICATION NO. | : 15/247720 |
| DATED | : September 24, 2019 |
| INVENTOR(S) | : John Grace et al. |

It is certified that error appears in the above-identified patent and that said Letters Patent is hereby corrected as shown below:

On the Title Page

Column 1, in Item (73) Assignee, at Line 1: Please insert --The-- before "University";

Column 1, in Item (73) Assignee, after Line 2: Please insert as Line 3 --The Regents of the University of Colorado--; and Column 1, in Item (73) Assignee, after Line 2 and the addition of Line 3: Please insert as Line 4 --Denver, Colorado (US)--.

Signed and Sealed this
Sixteenth Day of August, 2022

Katherine Kelly Vidal
*Director of the United States Patent and Trademark Office*